US012028512B2

(12) United States Patent
Jiang et al.

(10) Patent No.: US 12,028,512 B2
(45) Date of Patent: Jul. 2, 2024

(54) SYSTEMS AND METHODS FOR INTER-FRAME PREDICTION

(71) Applicant: ZHEJIANG DAHUA TECHNOLOGY CO., LTD., Zhejiang (CN)

(72) Inventors: Dong Jiang, Hangzhou (CN); Jucai Lin, Hangzhou (CN); Jun Yin, Hangzhou (CN); Feiyang Zeng, Hangzhou (CN); Cheng Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 211 days.

(21) Appl. No.: 17/457,920

(22) Filed: Dec. 7, 2021

(65) Prior Publication Data

US 2022/0094911 A1 Mar. 24, 2022

Related U.S. Application Data

(63) Continuation of application No. PCT/CN2020/098182, filed on Jun. 24, 2020.

(30) Foreign Application Priority Data

Jun. 25, 2019 (CN) .......................... 201910556646.0

(51) Int. Cl.
*H04N 19/105* (2014.01)
*H04N 19/119* (2014.01)
(Continued)

(52) U.S. Cl.
CPC ......... *H04N 19/105* (2014.11); *H04N 19/119* (2014.11); *H04N 19/137* (2014.11); *H04N 19/159* (2014.11); *H04N 19/176* (2014.11)

(58) Field of Classification Search
CPC ... H04N 19/105; H04N 19/119; H04N 19/137
See application file for complete search history.

(56) References Cited

U.S. PATENT DOCUMENTS

| 11,611,769 B2 * | 3/2023 | Wang ................... H04N 19/172 |
| 11,677,976 B2 * | 6/2023 | Leleannec ............ H04N 19/577 |
| | | 375/240.15 |

(Continued)

FOREIGN PATENT DOCUMENTS

| CN | 102223528 A | 10/2011 |
| CN | 104717513 A | 6/2015 |

(Continued)

OTHER PUBLICATIONS

ITU-T, Advanced Video Coding for Generic Audiovisual Services, Recommendation ITU-T H.264, 2013, 731 pages.

(Continued)

*Primary Examiner* — Michael Robert Cammarata
(74) *Attorney, Agent, or Firm* — METIS IP LLC

(57) ABSTRACT

The present disclosure provides a method for inter-frame prediction of a coding unit in an image. The method may include obtaining a first MV candidate list corresponding to the coding unit and the first MV candidate list may be constructed based on a non-triangle prediction mode, such as a merge mode. The method may also include determining, based on the first MV candidate list, a second MV candidate list corresponding to the coding unit. The second MV candidate list may be a triangle candidate list used for inter-prediction using a triangle prediction mode. MVs in the second MV candidate list may be determined based on MVs in the first MV candidate list. The method may also include determining, based on the second MV candidate list, a target prediction unit of the current coding unit according to a triangle prediction mode.

18 Claims, 12 Drawing Sheets

(51) Int. Cl.
  *H04N 19/137* (2014.01)
  *H04N 19/159* (2014.01)
  *H04N 19/176* (2014.01)

(56) References Cited

U.S. PATENT DOCUMENTS

| | | | | |
|---|---|---|---|---|
| 11,739,089 | B2* | 8/2023 | Urgaonkar | A61P 35/00 |
| | | | | 514/300 |
| 11,743,419 | B2* | 8/2023 | Lu | H04N 23/61 |
| 2020/0213593 | A1* | 7/2020 | Chiang | H04N 19/513 |
| 2020/0244979 | A1* | 7/2020 | Li | H04N 19/159 |
| 2020/0404253 | A1* | 12/2020 | Chen | B23P 15/00 |
| 2021/0218889 | A1 | 7/2021 | Kim | |
| 2021/0274162 | A1* | 9/2021 | Ahn | H04N 19/573 |
| 2021/0281859 | A1* | 9/2021 | Zhang | H04N 19/109 |
| 2021/0314593 | A1* | 10/2021 | Wang | H04N 19/137 |
| 2021/0321102 | A1* | 10/2021 | Chen | H04N 19/513 |
| 2022/0094913 | A1* | 3/2022 | Xiu | H04N 19/172 |
| 2022/0232248 | A1* | 7/2022 | Chen | H04N 19/577 |
| 2023/0254479 | A1* | 8/2023 | Liu | H04N 19/147 |
| | | | | 375/240.12 |
| 2023/0262213 | A1* | 8/2023 | Na | H04N 19/70 |
| | | | | 375/240.12 |

FOREIGN PATENT DOCUMENTS

| | | | | |
|---|---|---|---|---|
| CN | 106375764 | A | 2/2017 | |
| CN | 113196745 | A * | 7/2021 | H04N 19/44 |
| CN | 113196755 | A * | 7/2021 | H04N 19/115 |
| CN | 113287307 | A * | 8/2021 | H04N 19/105 |
| CN | 113302932 | A * | 8/2021 | H04N 19/132 |
| WO | 2020123220 | A1 | 6/2020 | |
| WO | 2020125752 | A1 | 6/2020 | |
| WO | WO-2020142685 | A1 * | 7/2020 | H04N 19/105 |
| WO | 2020259610 | A1 | 12/2020 | |

OTHER PUBLICATIONS

ITU-T, High Efficiency Video Coding, Recommendation ITU-T H.265, 2015, 635 pages.
Chen, Jianle et al., Algorithm Description for Versatile Video Coding and Test Model 4 (VTM 4), Joint Video Experts Team (JVET) of ITU-T SG 16 WP 3 and ISO/IEC JTC 1/SC 29/WG 11, JVET-M1002-v2, 2019, 62 pages.
Liao, Ru-Ling et al., CE10.3.1.b: Triangular Prediction Unit Mode, Joint Video Experts Team (JVET) of ITU-T SG 16 WP 3 and ISO/IEC JTC 1/SC 29/WG 11, JVET-L0124-v2, 2018, 8 pages.
Zhang, Li et al., CE10-Related: Merge List Construction Process for Triangular Prediction Mode, Joint Video Experts Team (JVET) of ITU-T SG 16 WP 3 and ISO/IEC JTC 1/SC 29/WG 11, JVET-M0271, 2019, 4 pages.
Wang, Hongtao et al., CE4: Using Regular Merge Candidate List for Triangular PU Mode (CE4-4.9), Joint Video Experts Team (JVET) of ITU-T SG 16 WP 3 and ISO/IEC JTC 1/SC 29/WG 11, JVET-N0418-v2, 2019, 5 pages.
International Search Report in PCT/CN2020/098182 mailed on Sep. 15, 2020, 4 pages.
Written Opinion in PCT/CN2020/098182 mailed on Sep. 15, 2020, 5 pages.
First Office Action in Chinese Application No. 201910556646.0 mailed on Jan. 6, 2021, 14 pages.
The Second Office Action in Chinese Application No. 201910556646.0 mailed on May 28, 2021, 16 pages.
The Extended European Search Report in European Application No. 20832944.1 mailed on Jul. 20, 2022, 17 pages.
Liao, Ru-Ling et al: CE10-related: Simplification of Triangular Prediction Unit Mode, Joint Video Experts Team (JVET) of ITU-T SG 16 WP 3 and ISO/IEC JTC 1/SC 29/WG 11, JVET-M0317-r3, 2019, 6 pages.
Liao, Ru-Ling et al., CE 10-related: Simplification of Triangular Prediction Unit Mode, Joint Video Experts Team (JVET) of ITU-T SG 16 WP 3 and ISO/IEC JTC 1/SC 29/WG 11, JVET-M0317, 2019, 14 pages.
Wang, Xianglin et al., CE4-related: An Improved Method for Triangle Merge List Construction, Joint Video Experts Team (JVET) of ITU-T SG 16 WP 3 and ISOIIEC JTC 1/SC 29/WG 11, JVET-N0340, 2019, 3 pages.
Chuang, Tzu-Der et al., CE 10-related: Simplification of triangle merging candidate list derivation, Joint Video Experts Team (JVET) of ITU-T SG 16 WP 3 and ISOIIEC JTC 1/SC 29/WG 11, JVET-M0184-v1, 2019, 3 pages.
Wang, Xianglin et al., Non-CE10: Triangle Prediction Merge List Construction, Joint Video Experts Team (JVET) of ITU-T SG 16 WP 3 and ISOIIEC JTC 1/SC 29/WG 11, JVET-M0233, 2019, 3 pages.

* cited by examiner

500

Obtaining a current coding unit in an image
502

Obtaining a first motion vector (MV) candidate list corresponding to the current coding unit
504

Determining, based on the first MV candidate list, a second MV candidate list corresponding to the current coding unit, the second motion vector candidate list including one or more bidirectional MVs
506

Determining, based on the second MV candidate list, at least one of a first target motion vector corresponding to a target first image block or a second target motion vector corresponding to a target second image block, wherein the target first image block and the target second image block are obtained by dividing the current unit based on a target division mode
508

Determining, based on the target division mode, the target first image block, or the target second image block, a target prediction unit of the current coding unit
510

Dividing a current coding unit into a first image block and a second image block according to each of one or more candidate division modes
602

Determining, based on a MV candidate list, multiple candidate groups of motion vectors, each candidate group of motion vectors including a first MV corresponding to the first image block and a second MV corresponding the second image block
604

Determining, based on the multiple candidate groups of motion vectors, multiple prediction results of the current coding unit
606

Determining, based on the prediction results of the current coding unit, a target group from the multiple candidate groups of motion vectors
608

| 4 | 5 | 6 | 7 |   |   |   |
|---|---|---|---|---|---|---|
| 3 | 4 | 5 | 6 | 7 |   |   |
| 2 | 3 | 4 | 5 | 6 | 7 |   |
| 1 | 2 | 3 | 4 | 5 | 6 | 7 |
|   | 1 | 2 | 3 | 4 | 5 | 6 |
|   |   | 1 | 2 | 3 | 4 | 5 |
|   |   |   | 1 | 2 | 3 | 4 |

First region $q/8*P1+(1-q/8)*P2$

Second region

FIG. 12

SYSTEMS AND METHODS FOR INTER-FRAME PREDICTION

CROSS-REFERENCE TO RELATED APPLICATIONS

This application is a continuation of International Application No. PCT/CN2020/098182, filed on Jun. 24, 2020, which claims priority to Chinese Patent Application No. 201910556646.0 filed on Jun. 25, 2019, the contents of each of which are incorporated herein by reference in their entirety.

TECHNICAL FIELD

The present disclosure generally relates to video encoding and decoding systems, and more particularly relates to methods and systems for inter-frame prediction in video encoding.

BACKGROUND

In storage or transmission of image data or video data, the image data or video data may be encoded or compressed into a video stream, which may reduce the amount of video data, thereby reducing network bandwidth and storage space. An encoding process may include prediction, transformation, quantization, entropy encoding, or the like. The prediction may include intra-frame prediction and inter-frame prediction, which is used to remove the spatial and temporal redundancy of video data, respectively. For example, the inter prediction may be performed on a video to obtain prediction values based on a correlation between frames in the video. To improve the accuracy of prediction values and the compression efficiency, a motion vector (MV) candidate list may be determined to estimate a target MV for inter prediction, that may be used to determine prediction values. Therefore, it is desirable to provide systems and/or methods for determining an MV candidate list for intra-prediction with improved accuracy and efficiency.

SUMMARY

According to an aspect of the present disclosure, a system is provided. The system may include at least one storage device storing executable instructions, and at least one processor in communication with the at least one storage device. When executing the executable instructions, the at least one processor may cause the system to perform one or more of the following operations. The system may obtain a current coding unit in an image. The system may further obtain a first MV candidate list corresponding to the current coding unit. The first MV candidate list may include at least one of a first bidirectional MV or a first unidirectional MV. The system may determine, based on the first MV candidate list, a second MV candidate list corresponding to the current coding unit. The second MV candidate list may include one or more second bidirectional MVs. The system may determine, based on the second MV candidate list, a target prediction unit of the current coding unit.

In some embodiments, the system may at least one of a first target MV corresponding to a target first image block or a second target MV corresponding to a target second image block. The target first image block and the target second image block may be obtained by dividing the current coding unit based on a target division mode. The system may further determine, based on the first target MV corresponding to the target first image block and the second target MV corresponding to the target second image block, the target prediction unit of the current coding unit.

In some embodiments, the one or more second bidirectional MVs in the second MV candidate list may include at least one of a second bidirectional MV of a first type or a second bidirectional MV of a second type. The second bidirectional MV of the first type may be determined based on a first bidirectional MV in the first MV candidate list. The second bidirectional MV of the second type may be constructed based on a first unidirectional MV in the first MV candidate list.

In some embodiments, to determine, based on the first MV candidate list, a second MV candidate list corresponding to the current coding unit, the at least one processor may be directed to cause the system to perform one or more of the following operations. The system may designate the first bidirectional MV in the first MV candidate list as the second bidirectional MV of the first type. An index of the first bidirectional MV in the first MV candidate list may be same as or different from an index of the first bidirectional MV in the second MV candidate list.

In some embodiments, the second bidirectional MV of the second type may include a first pointing MV and a second pointing MV, and to determine, based on the first MV candidate list, a second MV candidate list corresponding to the current coding unit, the at least one processor may be directed to cause the system to perform one or more of the following operations. The system may designate the first unidirectional MV in the first MV candidate list as the first pointing MV. The system may further determine, based on the first unidirectional MV and pictures of counts (POCs) of reference images of the image, the second pointing MV.

In some embodiments, the second MV candidate list may include one or more second unidirectional MVs.

In some embodiments, to determine, based on the first MV candidate list, a second MV candidate list corresponding to the current coding unit, the at least one processor may be directed to cause the system to perform one or more of the following operations. The system may designate a first unidirectional MV in the first MV candidate list as a second unidirectional MV in the second MV candidate list. An index of the first unidirectional MV in the first MV candidate list may be same as or different from an index of the first unidirectional MV in the second MV candidate list.

In some embodiments, a first bidirectional MV in the first MV candidate list may include a first pointing MV and a second pointing MV, and to determine, based on the first MV candidate list, a second MV candidate list corresponding to the current coding unit, the at least one processor may be directed to cause the system to perform one or more of the following operations. The system may designate the first pointing MV and the second pointing MV of the first bidirectional MV as two second unidirectional MVs in the second MV candidate list.

In some embodiments, to determine, based on the second MV candidate list, at least one of a first target MV corresponding to a target first image block or a second target MV corresponding to a target second image block, the at least one processor may be directed to cause the system to perform one or more of the following operations. The system may divide the current coding unit into a first image block and a second image block according to each of one or more candidate division modes. The system may further determine, based on the second MV candidate list, multiple candidate groups of motion vectors. Each candidate group of motion vectors may include a first MV corresponding to the first image block and a second MV corresponding to the second image block. The system may further determine, based on the multiple candidate groups of motion vectors, multiple prediction results of the current coding unit. The system may further determine, based on the prediction results of the current coding unit, a target group from the multiple candidate groups of motion vectors. The target group may include the first target MV corresponding to the target first image block or the second target MV corresponding to the target second image block.

In some embodiments, to determine, based on the multiple candidate groups of motion vectors, multiple prediction results of the current coding unit, the at least one processor may be directed to cause the system to perform one or more of the following operations. The system may determine, based on each of the one or more candidate division modes, a first region, a second region, and a boundary region in the current coding unit. The first region may include a portion of the first image block. The second region may include a portion of the second image block. The boundary region may include at least one of a portion of the first image block and a portion of the second image block that are located beside a division line corresponding to the candidate division mode. The system may further determine a prediction value of each pixel in the first region based on the first MV. The system may further determine a prediction value corresponding to each pixel in the second region based on the second MV. The system may further determine, based on the first MV and the second MV, a prediction value of each pixel in the boundary region. Each of the multiple prediction results of the current coding unit may include prediction values of pixels in the current coding unit.

In some embodiments, to determine, based on the first MV and the second MV, a prediction value of each pixel in the boundary region, the at least one processor may be directed to cause the system to perform one or more of the following operations. The system may determine, based on the first MV, a first prediction value of each pixel in the boundary region. The system may further determine, based on the second MV, a second prediction value of each pixel in the boundary region. The system may further determine, based on the first prediction value and the second prediction value, the prediction value of each pixel in the boundary region.

In some embodiments, to determine, based on the first prediction value and the second prediction value, the prediction value of each pixel in the boundary region using an interpolation algorithm, the at least one processor may be directed to cause the system to perform one or more of the following operations. The system may determine that the first MV is a second unidirectional MV, and the second MV is a second bidirectional MV. The system may obtain weighting values corresponding to the first prediction value and the second prediction value. The system may further determine at least one correction factor corresponding to at least one of the weighting values corresponding to the first prediction value and the second prediction value. The system may further determine, based on the first prediction value, the second prediction value, the weighting values, and the at least one correction factor, the prediction value of each pixel in the boundary region.

In some embodiments, the at least one correction factor may be configured to decrease one of the weighting values corresponding to the first prediction value determined based on the first MV.

In some embodiments, to determine, based on the first prediction value and the second prediction value, the pre-diction value of each pixel in the boundary region using an interpolation algorithm, the at least one processor may be directed to cause the system to perform one or more of the following operations. The system may determine that the first MV and the second MV are both second bidirectional MVs. At least one of the first MV and the second MV may be constructed based on a first unidirectional MV in the first MV candidate list. The system may further determine weighting values corresponding to the first prediction value and the second prediction value. At least one of the weighting values may be in a range from 0 to 0.5. The system may further determine, based on the first prediction value, the second prediction value, and the weighting values, the prediction value of each pixel in the boundary region.

In some embodiments, to determine, based on the prediction results of the current coding unit, a target group from the multiple candidate groups of motion vectors, the at least one processor may be directed to cause the system to perform one or more of the following operations. The system may determine, based on a prediction unit in each of the prediction results, multiple first rate distortion costs (RDcosts) each of which corresponds to one of the multiple candidate groups of motion vectors. The system may further determine, based on the first RDcosts, one or more first groups from the multiple candidate groups of motion vectors. The system may determine, based on prediction results corresponding to the one or more first groups of motion vectors, reconstruction results of the current coding unit. Each of the reconstruction results may include a reconstruction unit of the current coding unit. The system may further determine, based on the reconstruction unit in each of the reconstruction results, multiple second rate distortion costs (RDcosts) each of which corresponds to one of the one or more first groups of motion vectors. The system may further determine, based on the second RDcosts, the target group of motion vectors from the first one or more first groups of motion vectors.

In some embodiments, the at least one processor may be directed to cause the system to perform one or more of the following operations. The system may determine, based on the first target MV and the second target MV, a third target MV corresponding to a division line of the target division mode.

In some embodiments, to determine, based on the first target MV and the second target MV, a third target MV, the at least one processor may be directed to cause the system to perform one or more of the following operations. The system may determine that the first target MV includes a unidirectional MV, and the second target MV includes a bidirectional MV that including a first pointing MV and a second pointing MV. The system may further determine one of the first pointing MV and the second pointing MV that has a different pointing direction with the first target MV. The system may designate a combination of the first target MV and the one of the first pointing MV and the second pointing MV that has a different pointing direction with the first target MV as the third target MV.

In some embodiments, to determine, based on the first target MV and the second target MV, a third target MV, the at least one processor may be directed to cause the system to perform one or more of the following operations. The system may determine that the first target MV and the second target MV are both bidirectional MVs. The system may designate a combination of a pointing MV of the first target MV and a pointing MV of the second target MV as the third target MV. The pointing MV of the first target MV and the pointing MV of the second target MV may include different pointing directions.

According to another aspect of the present disclosure, a method is provided. The method may include obtaining a current coding unit in an image. The method may include obtaining a first MV candidate list corresponding to the current coding unit. The first MV candidate list may include at least one of a first bidirectional MV or a first unidirectional MV. The method may include determining, based on the first MV candidate list, a second MV candidate list corresponding to the current coding unit. The second MV candidate list may include one or more second bidirectional MVs. The method may include determining, based on the second MV candidate list, at least one of a first target MV corresponding to a target first image block or a second target MV corresponding to a target second image block. The target first image block and the target second image block may be obtained by dividing the current coding unit based on a target division mode. The method may further include determining, based on the first target MV corresponding to the target first image block and the second target MV corresponding to the target second image block, a target prediction unit of the current coding unit.

According to another aspect of the present disclosure, a system is provided. The system may include an acquisition module configured to obtain a current coding unit in an image. The system may include an MV candidate list determination module configured to determine a first MV candidate list corresponding to the current coding unit and a second MV candidate list corresponding to the current coding unit. The first MV candidate list may include at least one of a first bidirectional MV or a first unidirectional MV. The second MV candidate list may include one or more second bidirectional MVs. The system may further include a prediction module configured to determine, based on n the second MV candidate list, a target prediction unit of the current coding unit.

In some embodiments, the system may include an MV determination module configured to determine, based on the second MV candidate list, at least one of a first target MV corresponding to a target first image block or a second target MV corresponding to a target second image block. The target first image block and the target second image block may be obtained by dividing the current coding unit based on a target division mode. The MV determination module may be configured to determine, based on the first target MV corresponding to the target first image block and the second target MV corresponding to the target second image block, the target prediction unit of the current coding unit.

According to another aspect of the present disclosure, a non-transitory readable medium is provided. The non-transitory readable medium may include at least one set of instructions. When executed by at least one processor, the at least one set of instructions may direct the at least one processor to perform a method. The method may include obtaining a current coding unit in an image. The method may include obtaining a first MV candidate list corresponding to the current coding unit. The first MV candidate list may include at least one of a first bidirectional MV or a first unidirectional MV. The method may include determining, based on the first MV candidate list, a second MV candidate list corresponding to the current coding unit. The second MV candidate list may include one or more second bidirectional MVs. The method may include determining, based on the second MV candidate list, at least one of a first target MV corresponding to a target first image block or a second target MV corresponding to a target second image block. The target first image block and the target second image block may be obtained by dividing the current coding unit based on a target division mode. The method may further include determining, based on the first target MV corresponding to the target first image block and the second target MV corresponding to the target second image block, a target prediction unit of the current coding unit.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 5 is a flowchart illustrating an exemplary process for inter-frame prediction according to some embodiments of the present disclosure;

FIG. 6 is a flowchart illustrating an exemplary process for determining a target MV of a current coding unit from an MV candidate list according to some embodiments of the present application;

FIGS. 8A and 8B show exemplary MVs of pixels according to some embodiments of the present disclosure;

FIG. 10 shows an exemplary prediction unit of a luma block according to some embodiments of the present disclosure;

FIG. 12 shows an exemplary prediction unit of a luma block according to some embodiments of the present disclosure.

DETAILED DESCRIPTION

Figure 1:
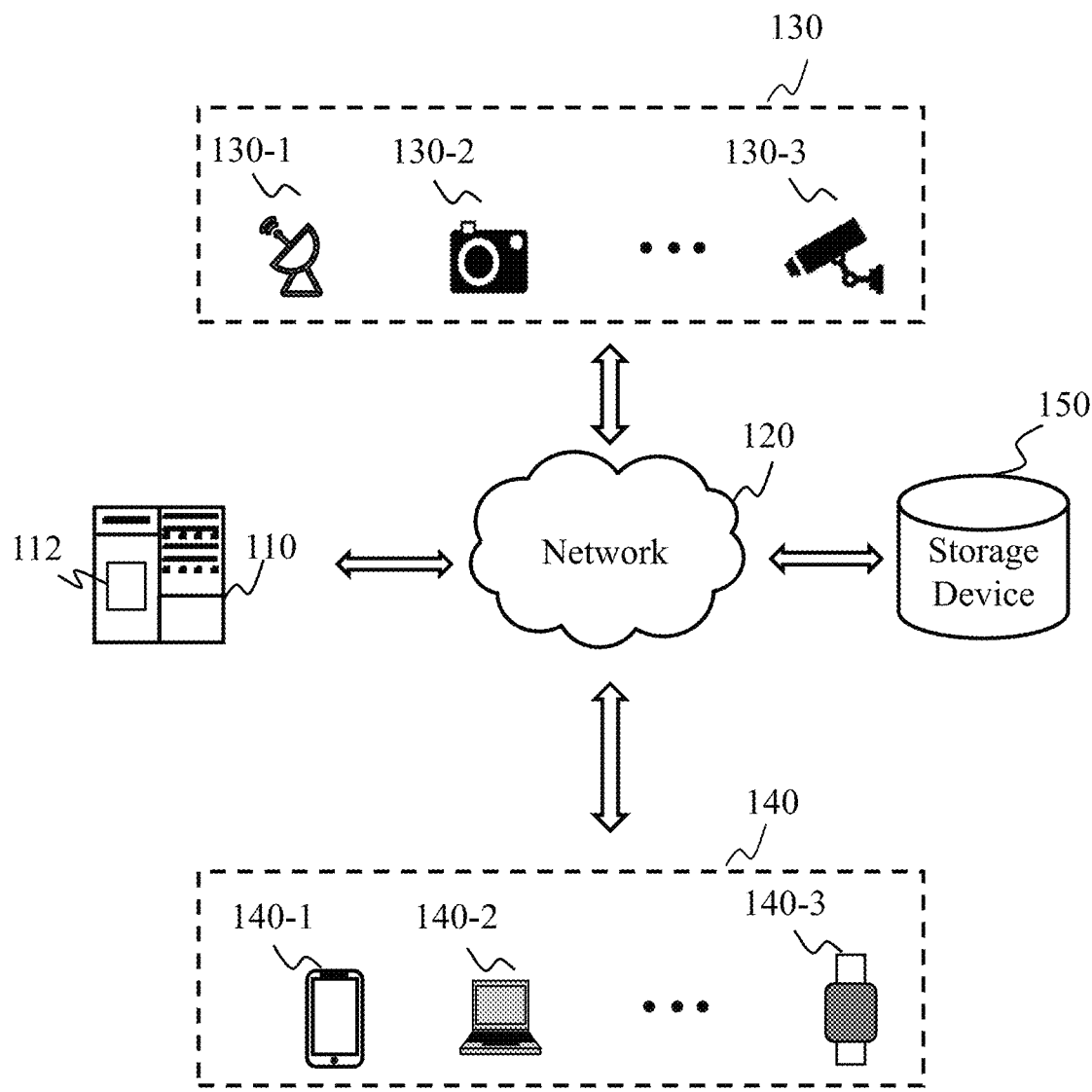
FIG. 1 is a schematic diagram illustrating an exemplary image coding system according to some embodiments of the present disclosure.

In order to illustrate the technical solutions related to the embodiments of the present disclosure, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. Unless apparent from the locale or otherwise stated, like reference numerals represent similar structures or operation throughout the several views of the drawings.

It will be understood that the term "system," "device," "unit," and/or "module" used herein are one method to distinguish different components, elements, parts, section or assembly of different level in ascending order. However, if other words may achieve the same purpose, the words may be replaced by other expressions.

As used in the disclosure and the appended claims, the singular forms "a," "an," and "the" include plural referents unless the content clearly dictates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that systems implement according to some embodiments of the present disclosure. It should be noted that the foregoing or the following operations may not be performed in the order accurately. Instead, the steps can be processed in reverse order or simultaneously. Besides, one or more other operations may be added to the flow charts, or one or more operations may be omitted from the flow chart.

FIG. 1 is a schematic diagram illustrating an exemplary image coding system according to some embodiments of the present disclosure. As shown, the image coding system 100 may include a server 110, a network 120, an acquisition device 130, a user device 140, and a storage device 150.

The server 110 may be a single server or a server group. The server group may be centralized or distributed (e.g., the server 110 may be a distributed system). In some embodiments, the server 110 may be local or remote. For example, the server 110 may access information and/or data stored in the acquisition device 130, the user device 140, and/or the storage device 150 via the network 120. As another example, the server 110 may be directly connected to the acquisition device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to image coding to perform one or more functions described in the present disclosure. For example, the processing device 112 may obtain a current coding unit in an image and a first motion vector (MV) candidate list corresponding to the current unit. The processing device 112 may determine, based on the first MV candidate list, a second MV candidate list corresponding to the current unit. The processing device 112 may determine, based on the second MV candidate list, at least one of a first target MV corresponding to a target first image block or a second target MV corresponding to a target second image block. The processing device 112 may determine, based on the target division mode, the target first image block, or the target second image block, a target prediction unit of the current coding unit. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the acquisition device 130, the user device 140) of the image coding system 100. For example, the processing device 112 may be integrated into the acquisition device 130 or the user device 140 and the functions (e.g., performing intra-prediction to an image) of the processing device 112 may be implemented by the acquisition device 130 or the user device 140.

The network 120 may facilitate exchange of information and/or data for the image coding system 100. In some embodiments, one or more components (e.g., the server 110, the acquisition device 130, the user device 140, the storage device 150) of the image coding system 100 may transmit information and/or data to other component(s) of the image coding system 100 via the network 120. For example, the server 110 may obtain an image to be coded from the acquisition device 130 via the network 120. As another example, the server 110 may obtain an intra-prediction mode associated with the image coding from the storage device 150. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The acquisition device 130 may be configured to acquire an image (the "image" herein refers to a single image or a frame of a video). In some embodiments, the acquisition device 130 may include a camera 130-1, a video recorder 130-2, a sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The sensor 130-1 may include an acceleration sensor (e.g., a piezoelectric sensor), a velocity sensor (e.g., a Hall sensor), a distance sensor (e.g., a radar, an infrared sensor), a steering angle sensor (e.g., a tilt sensor), a traction-related sensor (e.g., a force sensor), or the like, or any combination thereof. The image acquired by the acquisition device 130 may be a two-dimensional image, a three-dimensional image, a four-dimensional image, etc. In some embodiments, the acquisition device 130 may include a plurality of components each of which can acquire an image. For example, the acquisition device 130 may include a plurality of sub-cameras that can capture images or videos simultaneously. In some embodiments, the acquisition device 130 may transmit the acquired image to one or more components (e.g., the server 110, the user device 140, the storage device 150) of the image coding system 100 via the network 120.

The user device 140 may be configured to receive information and/or data from the server 110, the acquisition device 130, and/or the storage device 150 via the network 120. For example, the user device 140 may receive a coded image determined based on a plurality of predicted coding units corresponding to a plurality of coding units in the image from the server 110. In some embodiments, the user device 140 may process information and/or data received from the server 110, the acquisition device 130, and/or the storage device 150 via the network 120. For example, the user device 140 may decode the coded image received from the server 110. In some embodiments, the user device 140 may provide a user interface via which a user may view information and/or input data and/or instructions to the image coding system 100. For example, the user may view the decoded image via the user interface. As another example, the user may input an instruction associated with an image coding parameter via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combination thereof. The display of the user device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the user device 140 may be connected to one or more components (e.g., the server 110, the acquisition device 130, the storage device 150) of the image coding system 100 via the network 120.

The storage device 150 may be configured to store data and/or instructions. The data and/or instructions may be obtained from, for example, the server 110, the acquisition device 130, and/or any other component of the image coding system 100. In some embodiments, the storage device 150 may store data and/or instructions that the server 110 may execute or use to perform exemplary methods described in the present disclosure. For example, the storage device 150 may store the prediction mode associated with the image coding. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The storage device 150 may be configured to store data and/or instructions. For example, the storage device 150 may store data and/or instructions that the server 110 may execute or use to perform exemplary methods described in the present disclosure. In some embodiments, the storage device 150 may be connected to the network 120 to communicate with one or more components (e.g., the server 110, the acquisition device 130, the user device 140) of the image coding system 100. One or more components of the image coding system 100 may access the data or instructions stored in the storage device 150 via the network 120. In some embodiments, the storage device 150 may be directly connected to or communicate with one or more components (e.g., the server 110, the acquisition device 130, the user device 140) of the image coding system 100. In some embodiments, the storage device 150 may be part of other components of the image coding system 100, such as the server 110, the acquisition device 130, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
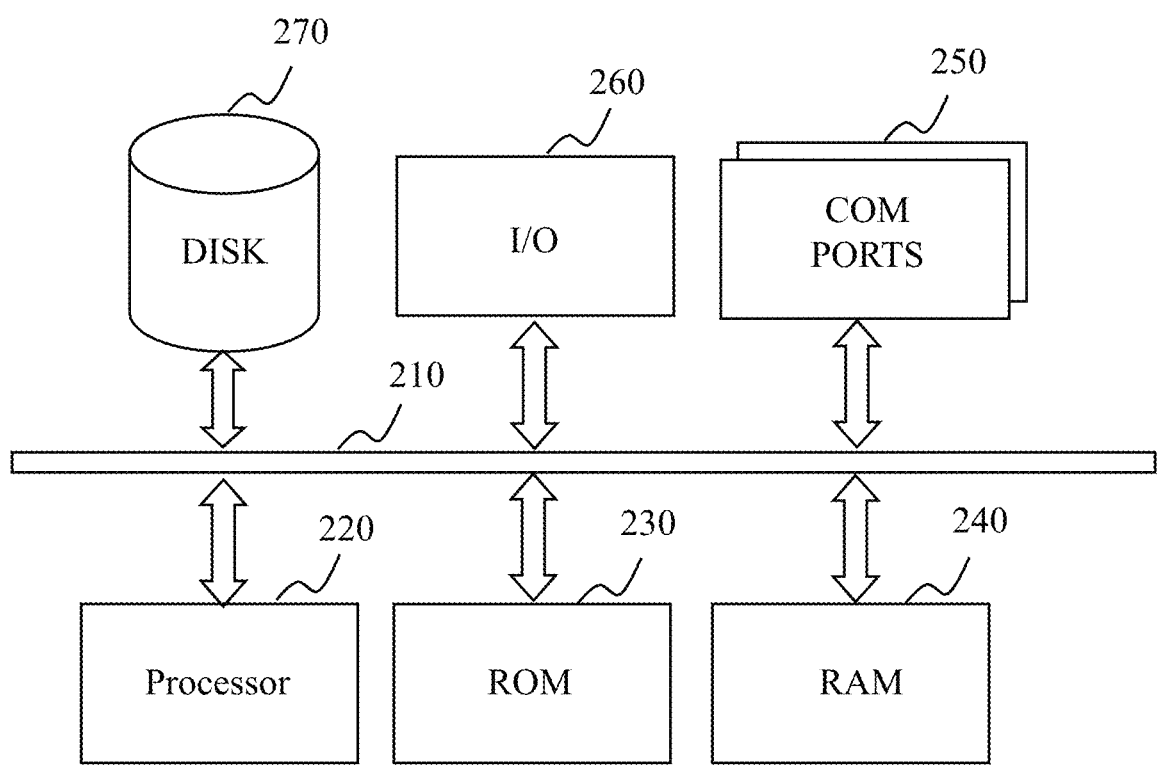
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the image coding system 100 as described herein. For example, the processing device 112 may be implemented on the computing device 200, via its hardware, software program, firmware, or a combination thereof. Although only one such computer is shown, for convenience, the computer functions relating to image coding as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an input/output (I/O) component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both operation A and operation B, it should be understood that operation A and operation B may also be performed by two different processors 220 jointly or separately in the computing device 200 (e.g., a first processor executes operation A and a second processor executes operation B, or the first and second processors jointly execute operations A and B).

Figure 3:
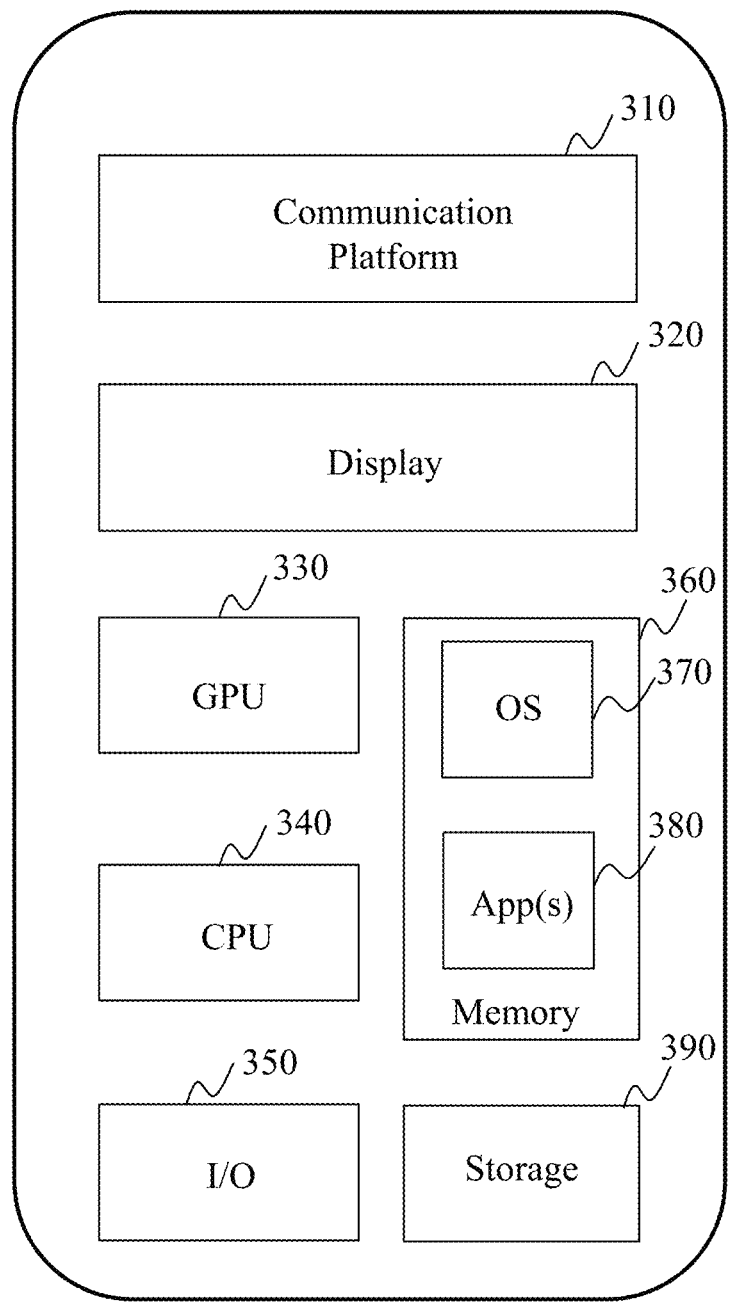
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the user device 140 may be implemented on the terminal device 300 shown in FIG. 3.

As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to image coding or other information from the processing device 112. User interactions may be achieved via the I/O 350 and provided to the processing device 112 and/or other components of the image coding system 100 via the network 120.

Figure 4:
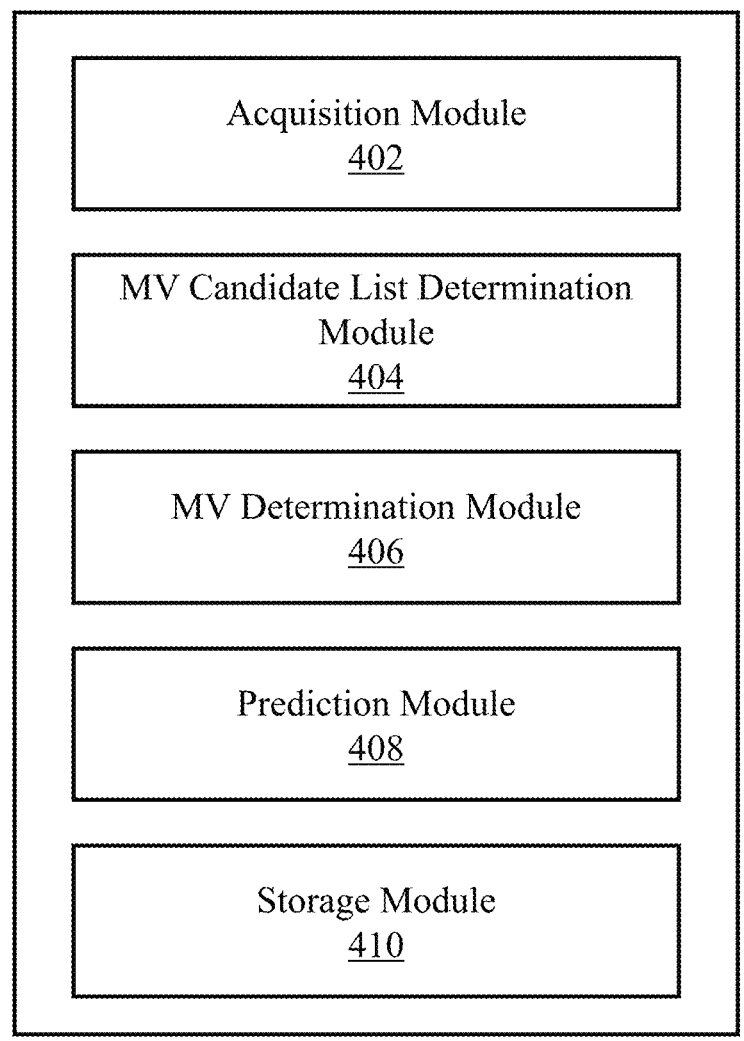
FIG. 4 is a block diagram illustrating an exemplary processing device according to some embodiments of the present disclosure.

FIG. 4 is a block diagram illustrating an exemplary processing device according to some embodiments of the present disclosure. As illustrated in FIG. 4, the processing device 400 may include an acquisition module 402, an MV candidate list determination module 404, an MV determination module 406, a prediction module 408, and a storage module 410. In some embodiments, the acquisition module 402, the MV candidate list determination module 404, the MV determination module 406, the prediction module 408, and the storage module 410 may be connected to and/or communicate with each other via a wireless connection (e.g., a network), a wired connection, or a combination thereof.

The acquisition module 402 may be configured to obtain information related to image encoding. For example, the acquisition module 402 may obtain an image. As another example, the acquisition module 402 may obtain a current coding unit in the image. The current coding unit may also be referred to as a current unit, a current block, or a current coding block that includes a plurality of pixels to be encoded. In some embodiments, the acquisition module 402 may obtain the image from the acquisition device 130, the user device 140, the storage device 150, etc.

The MV candidate list determination module 404 may be configured to determine one or more MV candidate lists. For example, the MV candidate list determination module 404 may determine a first MV candidate list corresponding to the current coding unit. The first MV candidate list may include a plurality of first MVs. As used herein, an MV in an MV candidate list may be defined by MV information including an MV value, an index of a reference frame, a prediction direction, etc. AN MV may include two pointing MVs that includes a forward MV and a backward MV. The two pointing MVs may respectively correspond to two different reference frames of the current coding unit. In some embodiments, the MV candidate list determination module 404 may construct, based on the current coding unit, the first MV candidate list based on a non-triangle prediction mode. Exemplary non-triangle prediction modes may include a merge mode, an AMVP mode, a CIIP mode, an affine merge mode, an affine AMVP mode, etc.

In some embodiments, the MV candidate list determination module 404 may determine a second MV candidate list based on the first MV candidate list. The second MV (MV) candidate list may include a plurality of second MVs.

In some embodiments, the plurality of second MVs may include one or more bidirectional MVs. Specifically, each second MV in the second MV candidate list may be a bidirectional MV.

In some embodiments, the plurality of second MVs may include one or more unidirectional MVs. Specifically, each second MV may be a unidirectional MV. In some embodiments, the one or more second unidirectional MVs may include a first portion and/or a second portion. A second unidirectional MV in the first portion may be determined based on a first unidirectional MV in the first MV candidate list. A second unidirectional MV in the second portion may be determined based on a first bidirectional MV in the first MV candidate list. For example, the processing device 112 may add one or more first unidirectional MVs to the second MV candidate list according to a random order. The indexes of the one or more first unidirectional MVs in the first MV candidate list may be the same as or different from the indexes of the one or more first unidirectional MVs in the second MV candidate list after being added to the second MV candidate list. As another example, the MV candidate list determination module 404 may designate two pointing MVs of a first bidirectional MV in the first MV candidate list as two second unidirectional MVs in the second MV candidate list.

In some embodiments, the plurality of second MVs may include one or more bidirectional MVs and one or more unidirectional MVs. In some embodiments, the one or more second bidirectional MVs in the second MV candidate list may include a first portion and/or a second portion. A second bidirectional MV in the first portion may be determined based on a first bidirectional MV in the first MV candidate list. For example, the processing device 112 may add one or more first bidirectional MVs to the second MV candidate list according to a random order. The indexes of the one or more first bidirectional MVs in the first MV candidate list may be the same as or different from the indexes of the one or more first bidirectional MVs in the second MV candidate list after being added to the second MV candidate list. An index of a first bidirectional MV in the first MV candidate list may indicate a position of the first bidirectional MV arranged in the first MV candidate list. A second bidirectional MV in the second portion may be determined based on a first unidirectional MV in the first MV candidate list.

The MV determination module 406 may be configured to determine, based on the second MV candidate list, at least one of a first target MV corresponding to a target first image block or a second target MV corresponding to a target second image block. The target first image block and the target second image block may be obtained by dividing the current coding unit based on a target division mode.

In some embodiments, the MV determination module 406 may determine multiple prediction results of the image using the plurality of second MVs in the second MV candidate list. Each of the multiple prediction results may include a prediction unit of the current coding unit. For example, the processing device 112 may determine multiple candidate groups of target MVs from the plurality of second MVs. Each of the multiple candidate groups of target MVs may include a first candidate MV corresponding to a candidate first image block and a second candidate MV corresponding to a candidate second image block. The candidate first image block and the candidate second image block may be obtained by dividing the current coding unit based on a division mode. The processing device 112 may determine an RDcost corresponding to each prediction unit. The processing device 112 may obtain multiple RDcosts corresponding to the multiple prediction units each of which corresponds to one of the multiple candidate groups of target MVs. The processing device 112 may determine one or more first groups from the multiple candidate groups of target MVs based on the multiple RDcosts. The one or more first groups may correspond to RDcosts whose values are less than a threshold or whose values are minimum among the multiple RDcosts corresponding to the multiple candidate groups of target MVs. More descriptions for determining the one or more first groups of target MVs may be found in FIG. 6 and the descriptions thereof.

In some embodiments, the MV determination module 406 may determine a third target MV corresponding to pixels on the boundary line based on the first target MV and the second target MV.

The prediction module 408 may be configured to determine a target prediction unit based on the first target MV corresponding to the target first image block and the second target MV corresponding to the target second image block.

In some embodiments, the prediction module 408 may determine a boundary region associated with a boundary line in the current coding unit.

In some embodiments, the boundary region may include a portion of the first image block and/or a portion of the second image block in the current coding unit. For example, the first image block may include a first portion and the second portion. The second image block may include a third portion and a fourth portion. The boundary region may include pixels in the second portion of the first image block and pixels in the fourth portion of the second image block. The processing device 112 may determine prediction values of pixels in the first portion of the first image block based on the first target MV. The processing device 112 may determine prediction values of pixels in the third portion of the second image block based on the second target MV. The processing device 112 may determine prediction values of pixels in the boundary region based on the first target MV and the second target MV.

For example, the processing device 112 may determine a first prediction value of a pixel in the boundary region based on the first target MV and determine a second prediction value based on the second target MV. The processing device 112 may determine a prediction value of a pixel based on the first prediction value and the second prediction value of the pixel using a filter interpolation technique. Further, the processing device 112 may determine the prediction value of the pixel based on the first prediction value, the second prediction value, and weighting values corresponding to the first prediction value and the second prediction value. For example, the prediction value of the pixel may be equal to a weighted sum of the first prediction value and the second prediction value using the weighting values corresponding to the first prediction value and the second prediction value, respectively.

The storage module 410 may be configured to store data generated during any process performed by any component in the processing device 112. For example, the storage module may store the first target MV, the second target MV, the third target MV, the first MV candidate list, the second MV candidate list, the prediction unit of the current coding unit, etc.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the storage module 410 may be omitted.

FIG. 5 is a flowchart illustrating an exemplary process for inter-frame prediction according to some embodiments of the present disclosure. In some embodiments, the process 500 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process as illustrated in FIG. 5 and described below is not intended to be limiting.

In 502, the processing device 112 (e.g., an acquisition module 402) may obtain a current coding unit in an image.

The current coding unit may also be referred to as a current unit, a current block, or a current coding block that includes a plurality of pixels to be encoded.

In some embodiments, the image may be a single image or a video frame to be encoded (or compressed). The image may be in a format of YUV (including a luminance component, a Cb chrominance component, and a Cr chrominance component), Red-Green-Blue (RGB) (which may be converted into the YUV format), etc. In some embodiments, the processing device 112 may obtain the image from the acquisition device 130 and extract the coding unit from the image. In some embodiments, the coding unit may be a quadrilateral region (e.g., a square) with a size in the image. As used herein, the size may include 2 pixels*2 pixels, 4 pixels*4 pixels, 8 pixels*8 pixels, 16 pixels*16 pixels, 32 pixels*32 pixels, 64 pixels*64 pixels, 128 pixels*128 pixels, etc. In some embodiments, the image may be a frame in a video collected by the acquisition device 130 (e.g., the camera 130-1, the video recorder 130-2, the sensor 130-3, etc.). The processing device 112 may determine the image (i.e., the frame) from the video. For example, the processing device 112 may perform a framing operation on the video to obtain a plurality of frames in the video. The processing device 112 may obtain one of the plurality of frames as the image.

In 504, the processing device 112 (e.g., the MV candidate list determination module 404) may determine a first motion vector (MV) candidate list corresponding to the current coding unit.

The first MV candidate list may include a plurality of first motion vectors (MVs). As used herein, an MV in an MV candidate list may be defined by MV information including an MV value, one or more indexes of one or more reference frames of the MV, prediction directions of the one or more reference frames, etc. An MV may include two pointing MVs that correspond to different pointing directions such as a forward MV and a backward MV. The two pointing MVs of an MV may respectively correspond to two different reference frames of the MV. The prediction directions of the two different reference frames may be the same or not. For example, the two different reference frames may be a forward reference frame and a backward reference frame, or two different forward reference frames, or two different backward reference frames. If the two pointing MVs of an MV are valid, the MV may be bidirectional. If one of the two pointing MVs of an MV is valid, the MV may be unidirectional. In some embodiments, at least one of the plurality of first MVs in the first MV candidate list may be bidirectional. For example, a first bidirectional MV may include a valid forward MV and a valid backward MV. In some embodiments, at least one of the plurality of first MVs in the first MV candidate list may be unidirectional. For example, a first unidirectional MV may include a combination of a valid forward MV and an invalid backward MV, or a combination of a valid backward MV and an invalid forward MV.

In some embodiments, the processing device 112 may obtain the first MV candidate list from a storage device (e.g., the storage device 150, the storage module 410, etc.)

In some embodiments, the processing device 112 may construct, based on the current coding unit, the first MV candidate list based on a non-triangle prediction mode. Exemplary non-triangle prediction modes may include a merge mode, an AMVP mode, a CIIP mode, an affine merge mode, an affine AMVP mode, etc. In some embodiments, the desired total count of the plurality of first MVs in the first MV candidate list may be set by a user or according to a default setting of the image coding system 100. For example, the processing device 112 may determine the desired total count of the plurality of first MVs based on the type of a prediction mode. For example, using the merge mode, the desired total count of the plurality of first MVs may be equal to 6. Using the AMVP mode, the desired total count of the plurality of first MVs may be equal to 2. The following descriptions are provided with reference to a prediction mode as the merge mode unless otherwise stated. It is understood that this is for illustration purposes and not intended to be limiting.

Figure 7A:
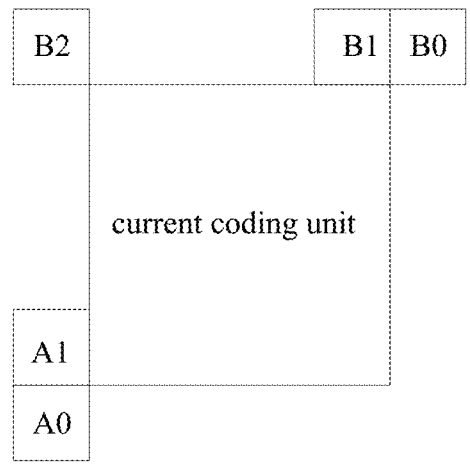
FIG. 7A is a schematic diagram illustrating an exemplary spatial domain blocks of the current coding unit according to some embodiments of the present disclosure.

In some embodiments, the processing device 112 may determine one or more first MVs based on one or more adjacent image blocks (also referred to as spatial domain blocks) of the current coding unit in a space domain. The processing device 112 may designate one or more MVs of the one or more spatial domain blocks as one or more first MVs in the first MV candidate list. As used herein, an adjacent image block of the current coding unit in the space domain refers to an image block in the image that is correlated to the current coding unit in the space domain. For example, FIG. 7A is a schematic diagram illustrating an exemplary spatial domain block of the current coding unit according to some embodiments of the present disclosure. As shown in FIG. 7A, the one or more spatial domain blocks of the current coding unit include spatial domain blocks A1, B1, B0, A0, and B2. The processing device 112 may acquire the MVs of A1, B1, B0, and A0 in sequence. When at least one of spatial domain blocks A1, B1, B0, and A0 do not exist and the MV of spatial domain block B2 is different from that of spatial domain blocks A1 and B1, the MV of the spatial domain block B2 may be added to the first MV candidate list. The MVs of the spatial domain blocks A1, B1, B0, A0, and (B2) may be arranged in the first MV candidate in the order of A1-B1-M-A0-(B2).

In some embodiments, when a spatial domain block and the current coding unit include the same reference image (also referred to as reference frame), the MV of the spatial domain block may be added to the first MV candidate list. When a spatial domain block and the current coding unit include different reference images, the MV of the spatial domain block may be added to the first MV candidate list after being scaled.

Figure 7B:
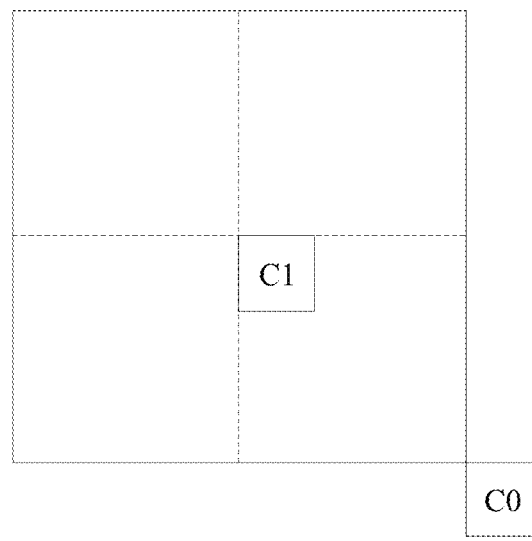
FIG. 7B is a schematic diagram illustrating exemplary time domain blocks of the current coding unit according to some embodiments of the present disclosure.

In some embodiments, if the count of MVs of the spatial domain blocks that have been added to the first MV candidate list is less than the desired total count of the plurality of first MVs in the first MV candidate list, the processing device 112 may determine one or more MVs of one or more image blocks (also referred to as time domain blocks) in an adjacent frame that is correlated to the current coding unit in a time domain. For example, using the merge mode, the desired total count of the plurality of first MVs in the first MV candidate list may be six and the maximum count of the one or more MVs of the spatial domain blocks may be four. The processing device 112 may determine one or more first MVs in the first MV candidate list based on the one or more MVs of the time domain blocks. For example, the processing device 112 may scale an MV of a time domain block based on a position relationship between reference images of the adjacent image and the image to obtain a scaled MV of the time domain block. The processing device 112 may add the scaled MV to the first MV candidate list. As used herein, a time domain block correlated to the current coding unit in a time domain may refer to an image block that is at the same location in the adjacent image (or adjacent frame) of the image (or frame) as where the current coding unit is located. The adjacent frame may also be referred to as a congruent frame, and the time domain block may also be referred to as a congruent block. In some embodiments, if the size of the current coding unit satisfies a condition, the processing device 112 may add the one or more MVs of the time domain blocks to the first MV candidate list. The size of the current coding unit satisfying the condition may include that the size of the current coding unit exceeds 4×4, or exceeds 8×4, or exceeds 4×8, etc. For example, FIG. 7B is a schematic diagram illustrating exemplary time domain blocks of the current coding unit according to some embodiments of the present disclosure. A congruent block of the current coding unit as shown in FIG. 7A is an image block C1. If the image block C0 is not available, the image block C1 may be used to determine an MV in the first second MV list.

In some embodiments, if a count of MVs (e.g., a sum of the count of MVs of the spatial domain blocks and the count of the MVs determined based on the time domain blocks) that have been added to the first MV candidate list is less than the desired total count of the plurality of first MVs in the first MV candidate list, the processing device 112 may determine one or more first MVs based on a historical MV prediction (HMVP) list. The HMVP list may include a plurality of MVs that have been used to encode one or more image blocks in one or more images. For example, using the merge mode, the desired total count of the plurality of first MVs may be six, the maximum count of the one or more vectors of the spatial domain blocks is four, and the maximum count of the one or more MVs of the time domain blocks may be 1. The processing device 112 may further add the one or more MVs in the HMVP list to the first MV candidate list. For example, the processing device 112 may compare MVs in the HMVP list with the first MVs in the first MV candidate list that are determined based on the spatial domain blocks and the time domain blocks in sequence. If an MV in the HMVP list is different from the first MVs in the first MV candidate list that are determined based on the spatial domain blocks and the time domain blocks, the processing device 112 may add the MV in the HMVP list to the first MV candidate list until the desired total count of the plurality of first MVs is reached.

In some embodiments, if a count of MVs (e.g., a sum of the count of MVs of the spatial domain blocks, the count of the MVs determined based on the time domain blocks, and the count of the one or more MVs determined from the HMVP list) that have been added to the first MV candidate list is less than the desired total count of the plurality of first MVs in the first MV candidate list, the processing device 112 may determine one or more MVs based on one or more first MVs that have been added in the first MV candidate list (e.g., the one or more MVs determined based on the one or more spatial domain blocks). For example, the processing device 112 may determine an average MV of first MVs arranged in the top (e.g., top two, top three, etc.) of the first MV candidate list. The processing device 112 may add the average MV to the first MV candidate list. In some embodiments, a first MV arranged in the top (e.g., top two, top three, etc.) of the first MV candidate list may a bidirectional MV including a forward MV and a backward MV. The processing device 112 may average forward MVs of the first MVs arranged in the top (e.g., top two, top three, etc.) of the first MV candidate list to obtain an average forward MV. The processing device 112 may average backward MVs of the MVs arranged in the top (e.g., top two, top three, etc.) of the first MV candidate list to obtain an average backward MV. The processing device 112 may add the average MV including the average forward MV and the average backward MV to the first MV candidate list.

In some embodiments, if the desired total count of the plurality of first MVs in the first MV candidate list is not reached, the processing device 112 may add zero MVs to the first MV candidate list until the desired total count of the plurality of first MVs in the first MV candidate list is reached. As used herein, a zero MV refers to a value of the MV is equal to zero.

In 506, the processing device 112 (e.g., the MV candidate list determination module 404) may determine a second MV candidate list based on the first MV candidate list. The second MV (MV) candidate list may include a plurality of second MVs.

In some embodiments, the plurality of second MVs may include one or more second bidirectional MVs. Specifically, each second MV may be a bidirectional MV. In some embodiments, the plurality of second MVs may include one or more second bidirectional MVs and one or more second unidirectional MVs. In some embodiments, the plurality of second MVs may include one or more second unidirectional MVs. Specifically, each second MV may be a unidirectional MV.

In some embodiments, the one or more second unidirectional MVs may include a first portion and/or a second portion. A second unidirectional MV in the first portion may be determined based on a first unidirectional MV in the first MV candidate list. A second unidirectional MV in the second portion may be determined based on a first bidirectional MV in the first MV candidate list. For example, the processing device 112 may add one or more first unidirectional MVs to the second MV candidate list according to a random order. The indexes of the one or more first unidirectional MVs in the first MV candidate list may be the same as or different from the indexes of the one or more first unidirectional MVs in the second MV candidate list after being added to the second MV candidate list. An index of a first unidirectional MV in the first MV candidate list may indicate a position of the first unidirectional MV arranged in the first MV candidate list. As used herein, a second unidirectional MV in the first portion may also be referred to as a second unidirectional MV of a first type and a second unidirectional MV in the second portion may also be referred to as a second unidirectional MV of a second type. In some embodiments, the processing device 112 may determine a second unidirectional MV of a second type based on a first bidirectional MV in the first MV candidate list by designating one of the two pointing MVs (e.g., a forward MV or a backward MV) of the first bidirectional MV as the second unidirectional MV of the second type. In some embodiments, the processing device 112 may designate two pointing MVs (e.g., a forward MV and a backward MV) of the first bidirectional MV as two second unidirectional MVs of the second type. For example, the first bidirectional MV may include a first pointing MV and a second pointing MV. The processing device 112 may designate the first pointing MV and the second pointing MV as two second unidirectional MVs in the second MV candidate list.

In some embodiments, the one or more second bidirectional MVs in the second MV candidate list may include a first portion and/or a second portion. A second bidirectional MV in the first portion may be determined based on a first bidirectional MV in the first MV candidate list. For example, the processing device 112 may add one or more first bidirectional MVs to the second MV candidate list according to a random order. The indexes of the one or more first bidirectional MVs in the first MV candidate list may be the same as or different from the indexes of the one or more first bidirectional MVs in the second MV candidate list after being added to the second MV candidate list. An index of a first bidirectional MV in the first MV candidate list may indicate a position of the first bidirectional MV arranged in the first MV candidate list. A second bidirectional MV in the second portion may be determined based on a first unidirectional MV in the first MV candidate list. As used herein, a second bidirectional MV in the first portion may also be referred to as a second bidirectional MV of a first type and a second bidirectional MV in the second portion may also be referred to as a second bidirectional MV of a second type.

The processing device 112 may construct a second bidirectional MV of the second type based on a first unidirectional MV in the first MV candidate list. For example, the second bidirectional MV of the second type may include a first pointing MV and a second pointing MV. The processing device 112 may designate a valid pointing MV of the first unidirectional MV as the first pointing MV (e.g., a forward MV). The processing device 112 may construct the second pointing MV (e.g., a backward MV) of the second bidirectional MV of the second type based on the valid pointing MV of the first unidirectional MV, a POC of the image, and a POC of a reference image corresponding to the image.

For example, if the valid pointing MV of the first unidirectional MV is a forward MV, the processing device 112 may designate the forward MV as the first pointing MV of the second bidirectional MV of the second type. The processing device 112 may construct the second point MV according to Equation (1) as follows:

$$MV2=(POC-POC2)/(POC-POC1)*MV1+\text{offset} \qquad (1),$$

where MV1 refers to the first pointing MV, MV2 refers to the second pointing MV, POC denotes the playing sequence of the current frame (i.e., the image obtained in 502), POC1 denotes the playing sequence of a first reference frame (i.e., a forward reference frame) corresponding to the first pointing MV (MV1), POC2 denotes the playing sequence of a second reference frame (i.e., a backward reference frame) of corresponding to the first pointing MV (MV1), POC1 is different from POC2, offset denotes a pixel offset within the preset range. The range of offset may be [T1, T2], where $-16 \leq T1 \leq 16$, $-16 \leq T2 \leq 16$, $T1 \leq T2$. POC is an abbreviation of picture order count, which is used to identify the order in which images are played.

As another example, if the valid pointing MV of the first unidirectional MV is a backward MV, the processing device 112 may designate the backward MV as the first pointing MV of the second bidirectional MV of the second type. The processing device 112 may construct the second point MV according to Equation (2) as follows:

$$MV2=(POC-POC1)/(POC-POC2)*MV1+\text{offset} \qquad (2),$$

where MV1 refers to the first pointing MV, MV2 refers to the second pointing MV, POC denotes the playing sequence of a current frame, POC1 denotes the playing sequence of a first reference frame (i.e., a forward reference frame), POC2 denotes the playing sequence of a second reference frame corresponding to the first pointing MV (MV1) (i.e., a backward reference frame), POC1 is different from POC2, offset denotes the pixel offset within the preset range. The range of offset may be [T1, T2], $-16 \leq T1 \leq 16$, $-16 \leq T2 \leq 16$, $T1 \leq T2$.

As a further example, the POC of the current frame may be equal to 8, the offset may be equal to (4, 4), the list of forward reference frames L0 may include {(0, 16}, the list of backward reference frame L1 may include {16, 0}, the valid pointing MV of the first unidirectional MV may be a forward MV (x, y), and a backward MV of the first unidirectional MV is invalid. The processing device 112 may designate the forward MV (x, y) as the first pointing MV of the second bidirectional MV of the second type. The processing device 112 may construct the second point MV (i.e., a backward MV) of the second bidirectional MV of the second type according to Equation (1). The POC1 of a forward reference frame of the current frame may be equal to 0 that is selected from L0. As the POC2 of a backward reference frame of the current frame cannot be equal to POC1, thus the POC2 of the backward reference frame may be equal to 16 that is selected in L1. According to Equation (1), the second point MV (i.e., a backward MV) of the second bidirectional MV of the second type may be equal to (−x+4, −y+4).

In 508, the processing device 112 (e.g., the MV determination module 406) may determine, based on the second MV candidate list, at least one of a first target MV corresponding to a target first image block or a second target MV corresponding to a target second image block. The target first image block and the target second image block may be obtained by dividing the current coding unit based on a target division mode.

In some embodiments, the processing device 112 may determine multiple prediction results of the image using the plurality of second MVs in the second MV candidate list. Each of the multiple prediction results may include a prediction unit of the current coding unit. For example, the processing device 112 may determine multiple candidate groups of MVs from the plurality of second MVs. Each of the multiple candidate groups of MVs may include a first candidate MV corresponding to a candidate first image block and a second candidate MV corresponding to a candidate second image block. The candidate first image block and the candidate second image block may be obtained by dividing the current coding unit based on a candidate division mode. The processing device 112 may determine a first RDcost corresponding to each prediction unit. The processing device 112 may obtain multiple first RDcosts corresponding to the multiple prediction units each of which corresponds to one of the multiple candidate groups of MVs. The processing device 112 may determine one or more first groups from the multiple candidate groups of MVs based on the multiple first RDcosts. The one or more first groups may correspond to first RDcosts whose values are less than a threshold or whose values are minimum among the multiple first RDcosts corresponding to the multiple candidate groups of MVs.

In some embodiments, the processing device 112 may determine multiple reconstruction results each of which is determined based on one of the prediction results corresponding to the first groups of target MVs. The processing device 112 may determine a target group of target MVs based on the multiple reconstruction results. Each of the multiple reconstruction results may include a reconstruction unit of the current coding unit. The processing device 112 may determine a second RDcost corresponding to each reconstruction unit to obtain multiple second RDcosts corresponding to the multiple reconstruction units each of which corresponds to one of the first groups of MVs. The processing device 112 may determine a target group from the first groups of MVs. The target group may correspond to a minimum second RDcost among the multiple second RDcosts corresponding to the multiple reconstruction units. The candidate MVs in the target group may be designated as the first target MV corresponding to the target first image block and the second target MV corresponding to the target second image block.

In some embodiments, the processing device 112 may determine a residual error between the current coding unit and the prediction unit. The processing device 112 may perform a transform and quantification operation on the residual error and perform an inverse transform and quantification on the residual error to obtain the reconstruction unit. More descriptions for determining the target group of MVs may be found in FIG. 6 and the descriptions thereof.

In 510, the processing device 112 (e.g., the prediction module 408) may determine a target prediction unit based on the first target MV corresponding to the target first image block and the second target MV corresponding to the target second image block.

In some embodiments, the target first image block and the target second image block may correspond to a target division mode of the current coding unit. The target first image block and the target second image block may be obtained by the processing device 112 divides the current coding unit according to the target division mode. The target division mode may include a division line that is used to divide the current coding unit into the first image block and the second image block. The division line may be defined by a direction and a position. For example, the division line may be a diagonal line of the current coding unit that may be used to divide the current coding unit into two triangle image blocks (i.e., the target first image block and the target second image block). The division line may also be referred to as a boundary line between the target first image block and the target second image block.

In some embodiments, the processing device 112 may determine a boundary region associated with the boundary line in the current coding unit. The boundary region associated with the boundary line may include multiple pixels located on reference lines that are distributed at two sides of the boundary line and multiple pixels located on the boundary line. Each reference line may be parallel to the boundary line. For example, for a luma block of the current coding unit, the boundary region may include pixels distributed on 7 lines that include the boundary line and six reference lines located at two sides of the boundary line. For a chroma block of the current coding unit, the boundary region may include pixels distributed on 3 lines that include the boundary line and two reference lines located at two sides of the boundary line.

In some embodiments, the boundary region may include a portion of the first image block and/or a portion of the second image block in the current coding unit. For example, the first image block may include a first portion and the second portion. The second image block may include a third portion and a fourth portion. The boundary region may include pixels in the second portion of the first image block and pixels in the fourth portion of the second image block. The processing device 112 may determine prediction values of pixels in the first portion of the first image block (i.e., a first region) based on the first target MV. The processing device 112 may determine prediction values of pixels in the third portion of the second image block (i.e., a second region) based on the second target MV. The processing device 112 may determine prediction values of pixels in the boundary region based on the first target MV and the second target MV.

For example, the processing device 112 may determine a first prediction value of a pixel in the boundary region based on the first target MV and determine a second prediction value based on the second target MV. The processing device 112 may determine a prediction value of a pixel based on the first prediction value and the second prediction value of the pixel. Further, the processing device 112 may determine the prediction value of the pixel based on the first prediction value, the second prediction value, and weighting values corresponding to the first prediction value and the second prediction value using an interpolation algorithm. For example, the prediction value of the pixel may be equal to a weighted sum of the first prediction value and the second prediction value using the weighting values corresponding to the first prediction value and the second prediction value, respectively. More descriptions for determining prediction values of the current coding unit may be found in FIG. 6 and the descriptions thereof.

Figures 8A, 8B:
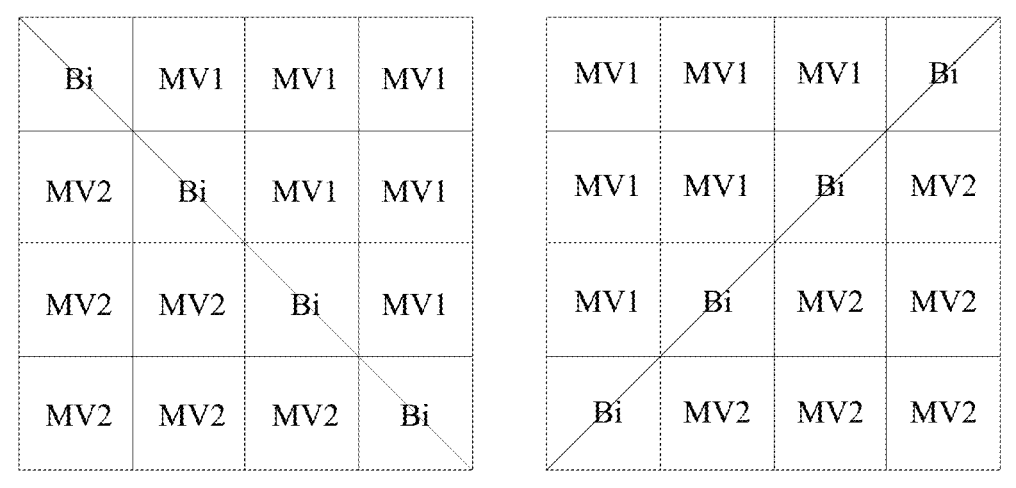

In some embodiments, the processing device 112 may determine a third target MV corresponding to pixels on the boundary line based on the first target MV and the second target MV. The processing device 112 may further store target MVs of pixels in the current coding unit. For example, FIGS. 8A and 8B show exemplary MVs of pixels according to some embodiments of the present disclosure. As shown in FIGS. 8A and 8B, MVs of pixels may be stored in a block of 4*4. Pixels in the first image block may correspond to the first target MV (MV1) and pixels in the second image block may correspond to the second target MV (MV2). Pixels on the boundary line may correspond to MVs (Bi) that may be determined based on the first target MV and/or the second target MV.

In some embodiments, if the first target MV and the second target MV are both unidirectional MVs, the processing device 112 may determine whether the first target MV and the second target MV include the same pointing direction that is valid. If the first target MV and the second target MV include different pointing directions that are valid, the processing device 112 may determine the third target MV including a combination of the first target MV and the second target MV.

If the first target MV and the second target MV include the same pointing direction that is valid, and the first target MV and the second target MV include valid forward MVs, the processing device 112 may determine whether the backward reference frames of the first target MV includes an image frame that is the same as the reference frame of the second target MV. If the backward reference frames of the first target MV includes an image frame that is the same as the reference frame of the second target MV, the processing device 112 may change the pointing direction of the second target MV from the forward direction to the backward direction to obtain a transform second MV and designate a combination of the first target MV and the transform second MV as the third target MV; if the backward reference frames of the first target MV do not include an image frame that is the same as the reference frame of the second target MV, the processing device 112 may designate the first target MV as the third target MV.

If the first target MV and the second target MV include the same pointing direction that is valid, and the first target MV and the second target MV include valid backward MVs, the processing device 112 may determine whether the forward reference frames of the second target MV include an image frame that is the same as the reference frame of the first target MV. If the forward reference frames of the second target MV include an image frame that is the same as the reference frame of the first target MV, the processing device 112 may change the pointing direction of the first target MV from the backward direction to the forward direction to obtain a transform first MV and designate a combination of the second target MV and the transform first MV as the third target MV; if the forward reference frames of the second target MV do not include an image frame that is the same as the reference frame of the first target MV, the processing device 112 may designate the second target MV as the third target MV.

In some embodiments, if one of the first target MV and the second target MV is a unidirectional MV and another one of the first target MV and the second target MV is a bidirectional MV, the processing device 112 may determine a pointing MV in the bidirectional MV that has a different pointing direction from the unidirectional MV. The processing device 112 may designate a combination of the point MV in the bidirectional MV that has a different pointing direction from the unidirectional MV and the unidirectional MV as the third target MV. For example, if the first target MV is a unidirectional MV including a valid pointing MV (MV0), the second target MV is a bidirectional MV including a first pointing MV (MV1) and a second pointing MV (MV2), and the pointing direction of the first pointing MV (MV1) is the same as that of the valid pointing MV (MV0), then the combination of MV0 and MV2 may be designated as the third target MV of each pixel on the boundary line.

In some embodiments, if the first target MV and the second target MV are both bidirectional MVs, the processing device 112 may determine a first pointing MV in the first target MV and a second pointing MV in the second target MV, and the first pointing MV and the second pointing MV may include different pointing directions. The processing device 112 may designate a combination of the first pointing MV and the second pointing MV as the third target MV. For example, if the first target MV and the second target MV are both bidirectional MVs, the first target MV includes a first pointing MV (MV1) and a second pointing MV (MV2), the second target MV includes a third pointing MV (MV3) and a fourth pointing MV (MV4), the pointing direction of the first pointing MV (MV1) is the same as that of the third pointing MV (MV3), and the pointing direction of the second pointing MV (MV2) is the same as that of the fourth pointing MV (MV4), the combination of MV1 and MV3 may be designated as the third target MV of each pixel on the boundary line, or the combination of MV2 and MV4 may be designated as the third target MV of each pixel on the boundary line.

In some embodiments, operation 508 and operation 510 may be combined into a single operation. For example, the processing device 112 may determine the target prediction unit of the current coding unit based on the second MV candidate list.

According to some embodiments of the present disclosure, one or more bidirectional MVs may be added to the target MV candidate list, which may increase the accuracy of the predicted unit, remove the temporal redundancy, and improve the compression rate of inter-frame encoding.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operation 510 may be omitted from process 500. As another example, operation 504 and operation 506 may be combined into a single operation.

FIG. 6 is a flowchart illustrating an exemplary process for determining a target MV of a current coding unit from an MV candidate list according to some embodiments of the present application. In some embodiments, the process 600 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 600. The operations of the illustrated process presented below are intended to be illustrative. In some embodiments, the process 600 may be accomplished with one or more additional operations not described and/or without one or more of the operations herein discussed. Additionally, the order in which the operations of the process as illustrated in FIG. 6 and described below is not intended to be limiting. Operation 508 may be performed according to process 600 as illustrated in FIG. 6.

In 602, the processing device 112 (e.g., the MV determination module 406) may divide a current coding unit in an image into a first image block and a second image block according to each of one or more candidate division modes. The first image block may also be referred to as a first coding sub-unit. The second image block may also be referred to as a second coding sub-unit.

In some embodiments, each candidate division mode may divide the current coding unit into two triangle image blocks (i.e., the first image block and the second image block) using a division line (also referred to as a boundary line between the first image block and the second image block). The division line may be defined by a direction and a position. The direction of the division line may be defined by an angle between the division line and a side of the current coding unit. If the current coding unit is a rectangular image block, the position of the division line may be located at a diagonal line of the current coding unit. The current coding unit in the rectangle shape may include two diagonal lines and the count of the one or more candidate division modes may be 2. For example, if the current coding unit includes a square shape, the angle between the division line and the side of the current coding unit may include 45 degrees or 135 degrees that correspond to two diagonal lines of the current coding unit.

Figure 9A:
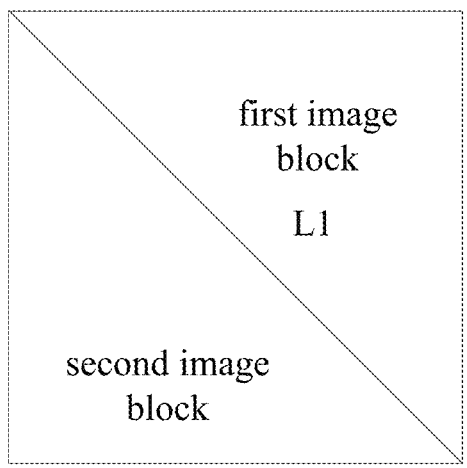
FIGS. 9A and 9B show exemplary division modes of a current coding unit according to some embodiments of the present disclosure.
Figure 9B:
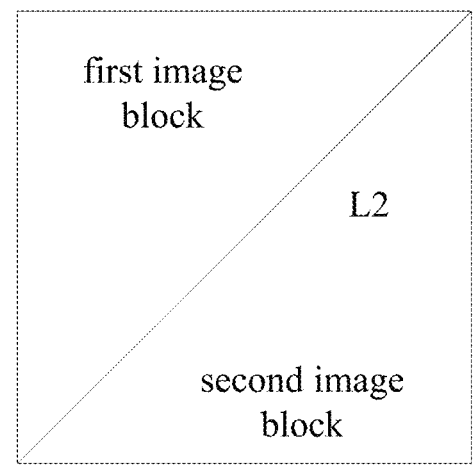

As a further example, FIGS. 9A and 9B show exemplary division modes of a current coding unit according to some embodiments of the present disclosure. As shown in FIG. 9A, the current coding unit was divided into the first image block and the second image block based on a first division mode that includes a division line L1. As shown in FIG. 9B, the current coding unit was divided into the first image block and the second image block based on a second division mode that includes a division line L2.

In 604, the processing device 112 (e.g., the MV determination module 406) may determine, based on an MV candidate list, multiple candidate groups of MVs. Each candidate group of MVs may include a first MV corresponding to the first image block and a second MV corresponding to the second image block. The first MV may be different from the second MV.

The MV candidate list may include multiple candidate MVs. In some embodiments, the MV candidate list may include a preliminary MV candidate list (e.g., the first candidate list as described in FIG. 5) that is determined based on a non-triangle prediction mode (e.g., the merge mode, the AMVP mode, etc.). In some embodiments, the MV candidate list may be determined based on a preliminary MV candidate list that is determined based on a non-triangle prediction mode (e.g., the merge mode, the AMVP mode, etc.). For example, the MV candidate list may include the second candidate list that is determined based on the first candidate list according to process 500 as described in FIG. 5. The second candidate list may include one or more second bidirectional MVs and/or one or more second unidirectional MVs. The one or more second unidirectional MVs may include a first type and/or a second type. A second unidirectional MV of the first type may be determined based on a first unidirectional MV in the first MV candidate list. A second unidirectional MV of the second type may be determined based on a first bidirectional MV in the first MV candidate list. The one or more second bidirectional MVs may include a first type and/or a second type. A second bidirectional MV of the first type may be determined based on a first bidirectional MV in the first MV candidate list. A second bidirectional MV of the second type may be determined based on a first unidirectional MV in the first MV candidate list.

In some embodiments, the processing device 112 may determine the multiple candidate groups of MVs using at least a portion of the multiple candidate MVs in the MV candidate list. For example, the processing device 112 may determine the multiple candidate groups of MVs using the multiple candidate MVs in the MV candidate list. For each candidate division mode, the processing device 112 may designate each of the multiple candidate MVs as the first MV of the first image block in sequence and designate one of the multiple candidate MVs that is different from the first MV as the second MV. If the count of the multiple candidate MVs is N and the count of the one or more candidate division modes is 2, the group count of the multiple candidate groups of MVs may be equal to 2*N*(N−1). As another example, the processing device 112 may determine the multiple candidate groups of MVs using a portion of the multiple candidate MVs in the MV candidate list. If the count of the portion of the multiple candidate MVs is L that is less than N and the count of the one or more candidate division modes is 2, the group count of the multiple candidate groups of MVs may be equal to 2*L*(L−1).

In 606, the processing device 112 (e.g., the MV determination module 406) may determine based on the multiple candidate groups of MVs, multiple prediction results of the current coding unit. Each of the multiple prediction results may include a prediction unit of the current coding unit. The prediction unit may include prediction values of pixels in the current coding unit.

In some embodiments, the processing device 112 may determine a first region, a second region, and a boundary region associated with the boundary line in the current coding unit. The processing device 112 may determine the prediction result by determining prediction values of pixels in the first region, the second region, and the boundary region, respectively.

The boundary region associated with the boundary line may include multiple pixels located on reference lines that are distributed around at least one of two sides of the boundary line and multiple pixels located on the boundary line. Each reference line may be parallel to the boundary line. For example, for a luma block of the current coding unit, the boundary region may include pixels distributed on 7 lines that include the boundary line and six reference lines located at two sides of the boundary line. For a chroma block of the current coding unit, the boundary region may include pixels distributed on 3 lines that include the boundary line and two reference lines located at two sides of the boundary line.

In some embodiments, the boundary region may include a portion of the first image block and/or a portion of the second image block in the current coding unit. The first region may include a rest portion of the first image blocks excluding the portion in the boundary region. The second region may include a rest portion of the second image block excluding the portion in the boundary region. For example, the first image block may include a first portion and the second portion. The second image block may include a third portion and a fourth portion. The boundary region may include pixels in the second portion of the first image block and pixels in the fourth portion of the second image block. The first region may include pixels in the first portion of the first image block and the second region may include pixels in the second portion of the second image block. As a further example, FIG. 8 shows an exemplary current coding unit according to some embodiments of the present disclosure. As shown in FIG. 8, a first region includes region P1, and a second region includes region P2. A boundary region includes pixels denoted by numbers 1-7. Pixels with numbers 1-3 are located at the first image block and pixels with numbers 5-7 are located at the second image block.

The processing device 112 may determine prediction values of pixels in the first region based on the first MV corresponding to the first image block in each candidate group. The processing device 112 may determine prediction values of pixels in the second region based on the second MV corresponding to the second image block in each candidate group. The processing device 112 may determine a prediction value of each pixel in the boundary region based on the first MV and the second MV. For example, the processing device 112 may determine a first prediction value of a pixel in the boundary region based on the first MV and determine a second prediction value of the pixel based on the second MV. The processing device 112 may determine a prediction value of the pixel based on the first prediction value and the second prediction value of the pixel using an interpolation technique with a filter. The filter may include weighting values each of which corresponds to pixels located on the same reference line or boundary line. The weighting values corresponding to the first prediction value and the second prediction value may be determined based on the filter. Further, the processing device 112 may determine the prediction value of the pixel based on the first prediction value, the second prediction value, and weighting values corresponding to the first prediction value and the second prediction value. For example, the prediction value of the pixel may be equal to a weighted sum of the first prediction value and the second prediction value using the weighting values corresponding to the first prediction value and the second prediction value, respectively.

In some embodiments, if the first MV and the second MV are both bidirectional MVs or both unidirectional MVs in the first type as described in operation 604, the processing device 120 may designate reference weighting values corresponding to the first MV and the second MV in the first MV candidate list as the weighting values corresponding to the first prediction value and the second prediction value. The reference weighting values corresponding to the first MV and the second MV in the first MV candidate list may be in a range from 0 to 1. In some embodiments, the weighting values corresponding to the first prediction value and the second prediction value may be determined based on a distance between the pixel to the boundary line. For example, if the pixel is in the first image block, the greater the distance between the pixel and the boundary line is, the greater the weighting value corresponding to the first MV of the pixel may be and the smaller the weighting value corresponding to the second prediction value may be; if the pixel is in the second image block, the greater the distance between the pixel and the boundary line is, the greater the weighting value corresponding to the second prediction value may be and the smaller the weighting value corresponding to the first prediction value may be. The first prediction values or the second prediction values of pixels that are located on the same reference line (or boundary line) may correspond to the same weighting value.

In some embodiments, if the first MV and the second MV are both bidirectional MVs or both unidirectional MVs in the second type as described in 604, the processing device 120 may determine the weighting values corresponding to the first prediction value and the second prediction value in a range from 0 to 0.5.

Figure 10:
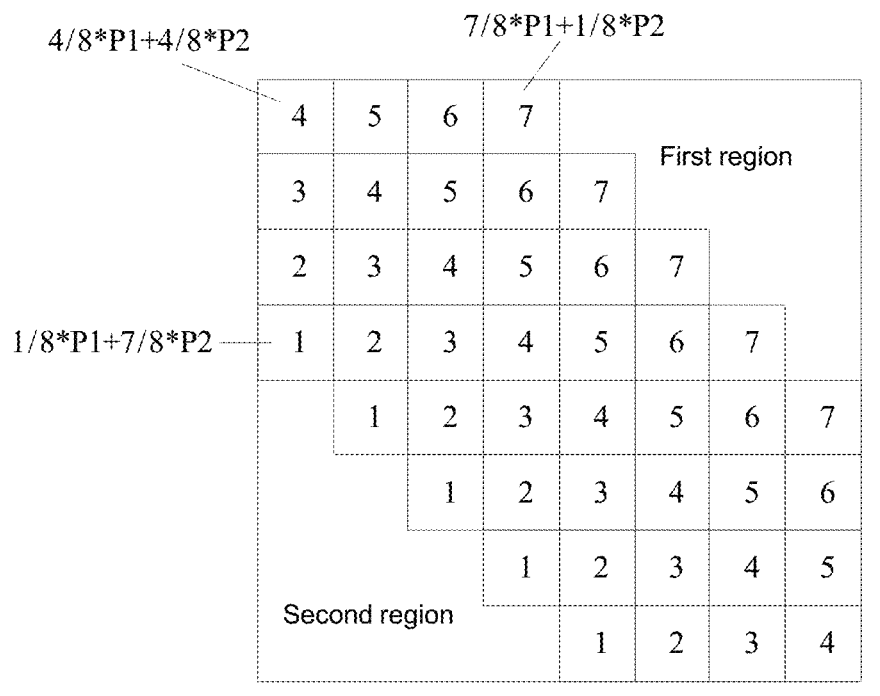

For example, FIG. 10 shows an exemplary prediction unit of a luma block according to some embodiments of the present disclosure. The boundary region in the luma block includes pixels distributed on 7 lines that include the boundary line and six reference lines located at two sides of the boundary line. The filter for the luma block is denoted as {7/8, 6/8, 5/8, 4/8, 3/8, 2/8, 1/8}. The prediction value of a pixel in the boundary region may be determined based on the first prediction value of the pixel determined based on the first MV and the second prediction value of the pixel determined based on the second MV. For example, a prediction value of a pixel with number 1 is equal to 1/8*P1+7/8*P2; a prediction value of a pixel with number 4 is equal to 4/8*P1+4/8*P2; a prediction value of a pixel with number 7 is equal to 7/8*P1+1/8*P2, where P1 denotes a first predication value of a pixel determined based on the first MV and P2 denotes a second predication value of the pixel determined based on the second MV.

Figure 11:
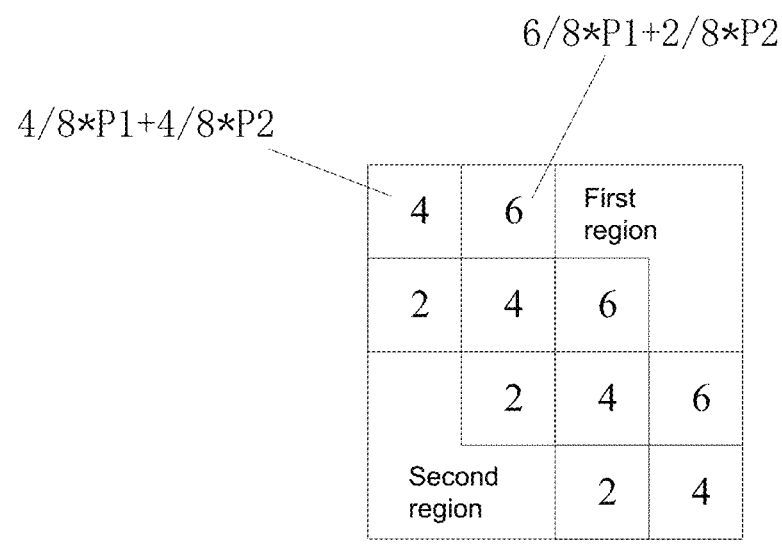
FIG. 11 shows an exemplary prediction unit of a chroma block according to some embodiments of the present disclosure.

As another example, FIG. 11 shows an exemplary prediction unit of a chroma block according to some embodiments of the present disclosure. For the chroma block of the current coding unit, the boundary region may include pixels distributed on 3 lines that include the boundary line and two reference lines located at two sides of the boundary line. The filter for the chroma block is denoted as {6/8, 4/8, 2/8}. The prediction value of a pixel in the boundary region may be determined based on the first prediction value of the pixel determined based on the first MV and the second prediction value of the pixel determined based on the second MV. For example, a prediction value of a pixel with number 4 is equal to 4/8*P1+4/8*P2; a prediction value of a pixel with number 6 is equal to 6/8*P1+2/8*P2, where P1 denotes a first predication value of a pixel determined based on the first MV and P2 denotes a second predication value of the pixel determined based on the second MV.

In some embodiments, if one of the first MV and the second MV include a bidirectional MV and another one of the first MV and the second MV includes a unidirectional MV, the processing device 112 may determine a correction factor for at least one of the weight values corresponding to the first prediction value and the second prediction value. The correction factor may be configured to decrease the weight value corresponding to one of the first prediction value and the second prediction value determined based on one of the first MV and the second MV that includes a unidirectional MV and/or increase the weight value corresponding to one of the first prediction value and the second prediction value determined based on one of the first MV and the second MV that includes a bidirectional MV.

For example, the processing device 112 may determine a correction factor for the weight value corresponding to the first prediction value if the first MV is the unidirectional MV or the weight value corresponding to the second prediction value if the second MV is the unidirectional MV, and the correction factor may be in a range from 0 to 1. As another example, the processing device 112 may determine a correction factor for the weight value corresponding to the first prediction value if the first MV is the bidirectional MV or the weight value corresponding to the second prediction value if the second MV is the bidirectional MV, and the correction factor may exceed 1. As still another example, the processing device 112 may determine a first correction factor and a second correction factor corresponding to the weighting value of the first prediction value and the weighting value of the second prediction value of a pixel, respectively. In some embodiments, the sum of the first correction factor and the second correction factor may be equal to 1 and the sum of the weighting values corresponding to the first prediction value and the second prediction value after being corrected may be less than 1.

As a further example, FIG. 12 shows an exemplary prediction unit of a luma block according to some embodiments of the present disclosure. The boundary region in the luma block includes pixels distributed on 7 lines that include the boundary line and six reference lines located at two sides of the boundary line. The filter for the luma block is denoted as {7/8, 6/8, 5/8, 4/8, 3/8, 2/8, 1/8}. The prediction value of a pixel in the boundary region may be determined based on the first prediction value of the pixel determined based on the first MV and the second prediction value of the pixel determined based on the second MV. The weighting value corresponding to the first prediction value of a pixel in the boundary region may be corrected based on a correction factor. For example, a prediction value of a pixel with number 1 is equal to $$\frac{q}{8}*P1+\left(1-\frac{q}{8}\right)*P2;$$

a prediction value of a pixel with number 4 is equal $$\frac{4q}{8}*P1+\left(1-\frac{4q}{8}\right)*P2;$$

a prediction value of a pixel with number 7 is equal to $$\frac{7q}{8}*P1+\left(1-\frac{7q}{8}\right)*P2,$$

where P1 denotes a first predication value of a pixel determined based on the first MV, P2 denotes a second predication value of the pixel determined based on the second MV, and q refers to the correction factor.

In some embodiments, the first correction factor and the second correction factor corresponding to the first prediction value and the second prediction value of a pixel may be determined based on a distance between the pixel to the boundary line. For example, if the pixel is in the first image block, the greater the distance between the pixel and the boundary line is, the greater the first correction factor corresponding to the first prediction value of the pixel may be and the smaller the second correction factor corresponding to the second prediction value may be; if the pixel is in the second image block, the greater the distance between the pixel and the boundary line is, the greater the second correction factor corresponding to the second prediction value may be and the smaller the first correction factor corresponding to the first prediction value may be. The first prediction values or the second prediction values of pixels that are located on the same reference line (or boundary line) may correspond to the same correction factor. In some embodiments, if the first MV includes a unidirectional MV and the MV includes a bidirectional MV, the first correction factor may be less than the second correction factor. For example, the first correction factor may be in a range from 0 to 0.5, or from 0 to 1, etc. The second correction factor may be in a range from 0.5 to 1 or exceed 1, etc.

In 606, the processing device 112 (e.g., the MV determination module 406) may determine, based on the prediction results of the current coding unit, a target group from the multiple candidate groups of MVs.

In some embodiments, the processing device 112 may determine a first rate distortion cost (RDcost) corresponding to each prediction unit in each of the prediction results. For example, the processing device 112 may determine the Rdcost of a prediction unit according to Equation (3) below:

$$Rd\text{cost} = D + \lambda * R \quad (3),$$

wherein D and R respectively represent a distortion loss and the number (or count) of bits when first MV and the second MV is used to predict the current coding unit, and $\lambda$ refers to a Lagrange factor.

The processing device 112 may obtain multiple RDcosts corresponding to the multiple prediction units each of which corresponds to one of the multiple candidate groups of MVs. The processing device 112 may determine one or more first candidate groups from the multiple candidate groups of MVs based on the multiple RDcosts. The one or more first candidate groups may correspond to RDcosts whose values are less than a threshold or whose values are minimum among the multiple RDcosts corresponding to the multiple candidate groups of MVs. The count of the one or more first candidate groups of MVs may exceed a count threshold, such as 3, 4, 5, etc.

In some embodiments, the processing device 112 may determine multiple reconstruction results each of which is determined based on one of the prediction results corresponding to the first candidate groups of MVs. The processing device 112 may determine one or more second candidate groups of MVs based on the multiple reconstruction results. Each of the multiple reconstruction results may include a reconstruction unit of the current coding unit. The processing device 112 may determine a second RDcost corresponding to each reconstruction unit to obtain multiple second RDcosts corresponding to the multiple reconstruction units each of which corresponds to one of the first candidate groups of MVs. The processing device 112 may determine the one or more second candidate groups from the first candidate groups of MVs based on the multiple second RDcosts. The one or more second candidate groups may correspond to second RDcosts whose values are less than a threshold or whose values are minimum among the multiple second RDcosts corresponding to the multiple first candidate groups of MVs. The count of the one or more second candidate groups of MVs may less a count threshold, such as 2, 3, 4, etc. In some embodiments, the processing device 112 may designate one of the one or more second candidate groups whose second RDcost is minimum among the multiple second RDcosts as the target group of MVs.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operations 602 may be omitted from process 600. As another example, operation 604 and operation 606 may be combined into a single operation.

The basic concepts have been described above. Obviously, for those skilled in the art, the detailed disclosure is merely by way of example, and does not constitute a limitation on the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. In addition, certain features, structures, or characteristics in one or more embodiments of the present disclosure may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure method does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters configured to illustrate the broad scope of some embodiments of the present disclosure are approximations, the numerical values in specific examples may be as accurate as possible within a practical scope.

Each patent, patent application, patent application publication and other materials cited herein, such as articles, books, instructions, publications, documents, etc., are hereby incorporated by reference in their entirety. In addition to the application history documents that are inconsistent or conflicting with the contents of the present disclosure, the documents that may limit the widest range of the claim of the present disclosure (currently or later attached to this application) is excluded from the present disclosure. It should be noted that if the description, definition, and/or terms used in the appended application of the present disclosure is inconsistent or conflicting with the content described in the present disclosure, the use of the description, definition and/or terms of the present disclosure shall prevail.

At last, it should be understood that the embodiments described in the present disclosure are merely illustrative of the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly described and described by the present disclosure.

What is claimed is:

1. A system, comprising:
   at least one storage device including a set of instructions; and
   at least one processor in communication with the at least one storage device, wherein when executing the set of instructions, the at least one processor is directed to cause the system to perform operations including:
      obtaining a first motion vector (MV) candidate list corresponding to a current coding unit in an image, the first MV candidate list including at least one of a first bidirectional MV or a first unidirectional MV;
      determining, based on the first MV candidate list, a second MV candidate list corresponding to the current coding unit, the second MV candidate list including one or more second bidirectional MVs;
      determining, based on the second MV candidate list, a target prediction unit of the current coding unit including:
         determining, based on the second MV candidate list, at least one of a first target MV corresponding to a target first image block or a second target MV corresponding to a target second image block, wherein the target first image block and the target second image block are obtained by dividing the current coding unit based on a target division mode;
         determining, based on the first target MV corresponding to the target first image block and the second target MV corresponding to the target second image block, the target prediction unit of the current coding unit, including:
            determining, based on the target division mode, a target boundary region including at least one of a portion of the target first image block and a portion of the target second image block that are located beside a division line corresponding to the target division mode;
            determining, based on the first target MV, a first prediction value of each pixel in the target boundary region;
            determining, based on the second target MV, a second prediction value of each pixel in the target boundary region;
            determining that the first target MV is a second unidirectional MV and the second target MV is a second bidirectional MV;
            obtaining weighting values corresponding to the first prediction value and the second prediction value of each pixel in the target boundary region;
            determining at least one correction factor corresponding to at least one of the weighting values corresponding to the first prediction value and the second prediction value of each pixel in the target boundary region; and
            determining, based on the first prediction value, the second prediction value, the weighting values, and the at least one correction factor, a target prediction value of each pixel in the target boundary region, wherein the one or more second bidirectional MVs in the second MV candidate list include at least one of a second bidirectional MV of a first type or a second bidirectional MV of a second type, the second bidirectional MV of the second type includes a first pointing MV and a second pointing MV, and
      to determine, based on the first MV candidate list, a second MV candidate list corresponding to the current coding unit, the at least one processor is directed to cause the system to perform operations including:
         designating the first unidirectional MV in the first MV candidate list as the first pointing MV; and
         determining, based on the first unidirectional MV and pictures of counts (POCs) of reference images of the image, the second pointing MV.

2. The system of claim 1, wherein the second bidirectional MV of the first type is determined based on a first bidirectional MV in the first MV candidate list, and the of the second type being constructed based on a first unidirectional MV in the first MV candidate list.

3. The system of claim 2, wherein to determine, based on the first MV candidate list, a second MV candidate list corresponding to the current coding unit, the at least one processor is directed to cause the system to perform operations including:
   designating the first bidirectional MV in the first MV candidate list as the second bidirectional MV of the first type, wherein an index of the first bidirectional MV in the first MV candidate list is same as or different from an index of the first bidirectional MV in the second MV candidate list.

4. The system of claim 1, wherein the second MV candidate list includes one or more second unidirectional MVs.

5. The system of claim 4, wherein to determine, based on the first MV candidate list, a second MV candidate list corresponding to the current coding unit, the at least one processor is directed to cause the system to perform operations including:
   designating a first unidirectional MV in the first MV candidate list as a second unidirectional MV in the second MV candidate list, wherein an index of the first unidirectional MV in the first MV candidate list is same as or different from an index of the first unidirectional MV in the second MV candidate list.

6. The system of claim 4, wherein a first bidirectional MV in the first MV candidate list includes a first pointing MV and a second pointing MV, and
to determine, based on the first MV candidate list, a second MV candidate list corresponding to the current coding unit, the at least one processor is directed to cause the system to perform operations including:
designating the first pointing MV and the second pointing MV of the first bidirectional MV as two second unidirectional MVs in the second MV candidate list.

7. The system of claim 1, wherein to determine, based on the second MV candidate list, at least one of a first target MV corresponding to a target first image block or a second target MV corresponding to a target second image block, the at least one processor is directed to cause the system to perform operations including:
dividing the current coding unit into a first image block and a second image block according to each of one or more candidate division modes;
determining, based on the second MV candidate list, multiple candidate groups of motion vectors, each candidate group of motion vectors including a first MV corresponding to the first image block and a second MV corresponding to the second image block;
determining, based on the multiple candidate groups of motion vectors, multiple prediction results of the current coding unit; and
determining, based on the prediction results of the current coding unit, a target group from the multiple candidate groups of motion vectors, the target group including the first target MV corresponding to the target first image block or the second target MV corresponding to the target second image block.

8. The system of claim 7, wherein to determine, based on the multiple candidate groups of motion vectors, multiple prediction results of the current coding unit, the at least one processor is directed to cause the system to perform operations including:
determining, based on each of the one or more candidate division modes, a first region, a second region, and a boundary region in the current coding unit, the first region including a portion of the first image block, the second region including a portion of the second image block, and the boundary region including at least one of a portion of the first image block and a portion of the second image block that are located beside a division line corresponding to the candidate division mode;
determining a prediction value of each pixel in the first region based on the first MV;
determining a prediction value corresponding to each pixel in the second region based on the second MV; and
determining, based on the first MV and the second MV, a prediction value of each pixel in the boundary region, wherein each of the multiple prediction results of the current coding unit includes prediction values of pixels in the current coding unit.

9. The system of claim 8, wherein to determine, based on the first MV and the second MV, a prediction value of each pixel in the boundary region, the at least one processor is directed to cause the system to perform operations including:
determining, based on the first MV, a first prediction value of each pixel in the boundary region;
determining, based on the second MV, a second prediction value of each pixel in the boundary region;
determining, based on the first prediction value and the second prediction value of each pixel in the boundary region, the prediction value of each pixel in the boundary region.

10. The system of claim 9, wherein to determine, based on the first prediction value and the second prediction value, the prediction value of each pixel in the boundary region using an interpolation algorithm, the at least one processor is directed to cause the system to perform operations including:
determining that the first MV is a second unidirectional MV, and the second MV is a second bidirectional MV;
obtaining weighting values corresponding to the first prediction value and the second prediction value of each pixel in the boundary region;
determining at least one correction factor corresponding to at least one of the weighting values corresponding to the first prediction value and the second prediction value of each pixel in the boundary region; and
determining, based on the first prediction value, the second prediction value, the weighting values, and the at least one correction factor, the prediction value of each pixel in the boundary region.

11. The system of claim 10, wherein the at least one correction factor is configured to decrease one of the weighting values corresponding to the first prediction value of each pixel in the boundary region determined based on the first MV.

12. The system of claim 8, wherein to determine, based on the first prediction value and the second prediction value, the prediction value of each pixel in the boundary region using an interpolation algorithm, the at least one processor is directed to cause the system to perform operations including:
determining that the first MV and the second MV are both second bidirectional MVs, at least one of the first MV or the second MV is constructed based on a first unidirectional MV in the first MV candidate list;
determining weighting values corresponding to the first prediction value and the second prediction value, at least one of the weighting values being in a range from 0 to 0.5; and
determining, based on the first prediction value, the second prediction value, and the weighting values, the prediction value of each pixel in the boundary region.

13. The system of claim 7, wherein to determine, based on the prediction results of the current coding unit, a target group from the multiple candidate groups of motion vectors, the at least one processor is directed to cause the system to perform operations including:
determining, based on a prediction unit in each of the prediction results, multiple first rate distortion costs (RDcosts) each of which corresponds to one of the multiple candidate groups of motion vectors;
determining, based on the first RDcosts, one or more first groups from the multiple candidate groups of motion vectors;
determining, based on prediction results corresponding to the one or more first groups of motion vectors, reconstruction results of the current coding unit, each of the reconstruction results including a reconstruction unit of the current coding unit;
determining, based on the reconstruction unit in each of the reconstruction results, multiple second rate distortion costs (RDcosts) each of which corresponds to one of the one or more first groups of motion vectors; and determining, based on the second RDcosts, the target group of motion vectors from the one or more first groups of motion vectors.

14. The system of claim 1, wherein the at least one processor is directed to cause the system to perform operations including: determining, based on the first target MV and the second target MV, a third target MV corresponding to a division line of the target division mode.

15. The system of claim 14, wherein to determine, based on the first target MV and the second target MV, a third target MV, the at least one processor is directed to cause the system to perform operations including:
    determining that the first target MV includes a unidirectional MV, and the second target MV includes a bidirectional MV that including a first pointing MV and a second pointing MV;
    determining one of the first pointing MV and the second pointing MV that has a different pointing direction with the first target MV; and
    designating a combination of the first target MV and the one of the first pointing MV and the second pointing MV that has a different pointing direction with the first target MV as the third target MV.

16. The system of claim 14, wherein to determine, based on the first target MV and the second target MV, a third target MV, the at least one processor is directed to cause the system to perform operations including:
    determining that the first target MV and the second target MV are both bidirectional MVs; and
    designating a combination of a pointing MV of the first target MV and a pointing MV of the second target MV as the third target MV, the pointing MV of the first target MV and the pointing MV of the second target MV including different pointing directions.

17. A method implemented on a computing device having at least one processor and at least one storage device, comprising:
    obtaining a first MV candidate list corresponding to a current coding unit in an image, the first MV candidate list including at least one of a first bidirectional MV or a first unidirectional MV;
    determining, based on the first MV candidate list, a second MV candidate list corresponding to the current coding unit, the second MV candidate list including one or more second bidirectional MVs;
    determining, based on the second MV candidate list, a target prediction unit of the current coding unit, including:
    determining, based on the second MV candidate list, at least one of a first target MV corresponding to a target first image block or a second target MV corresponding to a target second image block, wherein the target first image block and the target second image block are obtained by dividing the current coding unit based on a target division mode;
    determining, based on the first target MV corresponding to the target first image block and the second target MV corresponding to the target second image block, the target prediction unit of the current coding unit, including:
    determining, based on the target division mode, a target boundary region including at least one of a portion of the target first image block and a portion of the target second image block that are located beside a division line corresponding to the target division mode;
    determining, based on the first target MV, a first prediction value of each pixel in the target boundary region;

determining, based on the second target MV, a second prediction value of each pixel in the target boundary region;
determining that the first target MV is a second unidirectional MV and the second target MV is a second bidirectional MV;
obtaining weighting values corresponding to the first prediction value and the second prediction value of each pixel in the target boundary region;
determining at least one correction factor corresponding to at least one of the weighting values corresponding to the first prediction value and the second prediction value of each pixel in the target boundary region; and
determining, based on the first prediction value, the second prediction value, the weighting values, and the at least one correction factor, a target prediction value of each pixel in the target boundary region,
wherein the one or more second bidirectional MVs in the second MV candidate list include at least one of a second bidirectional MV of a first type or a second bidirectional MV of a second type, the second bidirectional MV of the second type includes a first pointing MV and a second pointing MV, and
to determine, based on the first MV candidate list, a second MV candidate list corresponding to the current coding unit, the at least one processor is directed to cause the system to perform operations including:
    designating the first unidirectional MV in the first MV candidate list as the first pointing MV; and
    determining, based on the first unidirectional MV and pictures of counts (POCs) of reference images of the image, the second pointing MV.

18. A non-transitory computer readable medium, comprising at least one set of instructions, wherein when executed by at least one processor, the at least one set of instructions directs the at least one processor to perform operations including:
    obtaining a first MV candidate list corresponding to a current coding unit in an image, the first MV candidate list including at least one of a first bidirectional MV or a first unidirectional MV;
    determining, based on the first MV candidate list, a second MV candidate list corresponding to the current coding unit, the second MV candidate list including one or more second bidirectional MVs;
    determining, based on the second MV candidate list, a target prediction unit of the current coding unit, including:
    determining, based on the second MV candidate list, at least one of a first target MV corresponding to a target first image block or a second target MV corresponding to a target second image block, wherein the target first image block and the target second image block are obtained by dividing the current coding unit based on a target division mode;
    determining, based on the first target MV corresponding to the target first image block and the second target MV corresponding to the target second image block, the target prediction unit of the current coding unit, including:
    determining, based on the target division mode, a target boundary region including at least one of a portion of the target first image block and a portion of the target second image block that are located beside a division line corresponding to the target division mode;
    determining, based on the first target MV, a first prediction value of each pixel in the target boundary region;

determining, based on the second target MV, a second prediction value of each pixel in the target boundary region;

determining that the first target MV is a second unidirectional MV and the second target MV is a second bidirectional MV;

obtaining weighting values corresponding to the first prediction value and the second prediction value of each pixel in the target boundary region;

determining at least one correction factor corresponding to at least one of the weighting values corresponding to the first prediction value and the second prediction value of each pixel in the target boundary region; and determining, based on the first prediction value, the second prediction value, the weighting values, and the at least one correction factor, a target prediction value of each pixel in the target boundary region, wherein the one or more second bidirectional MVs in the second MV candidate list include at least one of a second bidirectional MV of a first type or a second bidirectional MV of a second type, the second bidirectional MV of the second type includes a first pointing MV and a second pointing MV, and to determine, based on the first MV candidate list, a second MV candidate list corresponding to the current coding unit, the at least one processor is directed to cause the system to perform operations including:

designating the first unidirectional MV in the first MV candidate list as the first pointing MV; and determining, based on the first unidirectional MV and pictures of counts (POCs) of reference images of the image, the second pointing MV.

* * * * *